(12) United States Patent
Wu et al.

(10) Patent No.: US 12,126,419 B2
(45) Date of Patent: Oct. 22, 2024

(54) METHOD AND DEVICE USED IN UE AND BASE STATION FOR WIRELESS COMMUNICATION

(71) Applicants: Keying Wu, Shanghai (CN); Xiaobo Zhang, Shanghai (CN); Lin Yang, Shanghai (CN)

(72) Inventors: Keying Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/396,752

(22) Filed: Dec. 27, 2023

(65) Prior Publication Data

US 2024/0129010 A1   Apr. 18, 2024

Related U.S. Application Data

(63) Continuation of application No. 17/324,123, filed on May 19, 2021, now Pat. No. 11,901,994, which is a continuation of application No. PCT/CN2019/118141, filed on Nov. 13, 2019.

(30) Foreign Application Priority Data

Nov. 23, 2018  (CN) .......................... 201811403954.1

(51) Int. Cl.
H04B 7/0426   (2017.01)
H04B 7/0456   (2017.01)
H04B 7/06     (2006.01)

(52) U.S. Cl.
CPC ......... *H04B 7/0639* (2013.01); *H04B 7/0426* (2013.01); *H04B 7/0626* (2013.01)

(58) Field of Classification Search
None
See application file for complete search history.

(56) References Cited

U.S. PATENT DOCUMENTS

| | | | | |
|---|---|---|---|---|
| 2017/0013564 A1* | 1/2017 | Yi | ........................ | H04W 52/146 |
| 2019/0327693 A1* | 10/2019 | Rahman | ................ | H04W 52/42 |
| 2019/0393939 A1* | 12/2019 | Huang | .................. | H04W 52/42 |
| 2020/0045644 A1* | 2/2020 | Sridharan | ........... | H04W 52/367 |
| 2020/0154364 A1* | 5/2020 | Rahman | .............. | H04B 7/0404 |
| 2021/0143874 A1* | 5/2021 | Park | ...................... | H04W 72/23 |
| 2021/0175950 A1* | 6/2021 | Sergeev | .............. | H04B 7/0486 |
| 2023/0291447 A1* | 9/2023 | Wernersson | ........ | H04W 52/146 |

* cited by examiner

*Primary Examiner* — Duc T Duong

(57) ABSTRACT

The present disclosure provides a method and a device used in a User Equipment (UE) and a base station for wireless communications. The UE receives a first signaling; and transmits a first radio signal; wherein the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients. The above method optimizes Uplink transmit power according to the UE's own capabilities.

20 Claims, 7 Drawing Sheets

UE receiving first signaling transmitting first radio signal

Linear value of first power = Linear value of second power × First coefficient
FIG. 6
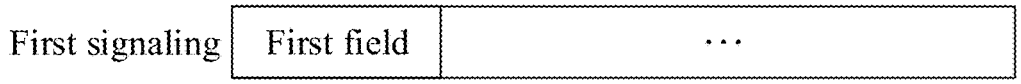
FIG. 7
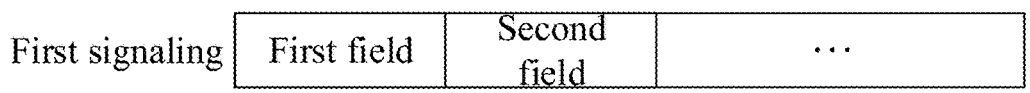
FIG. 8
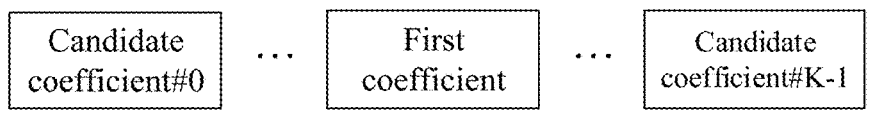
FIG. 9
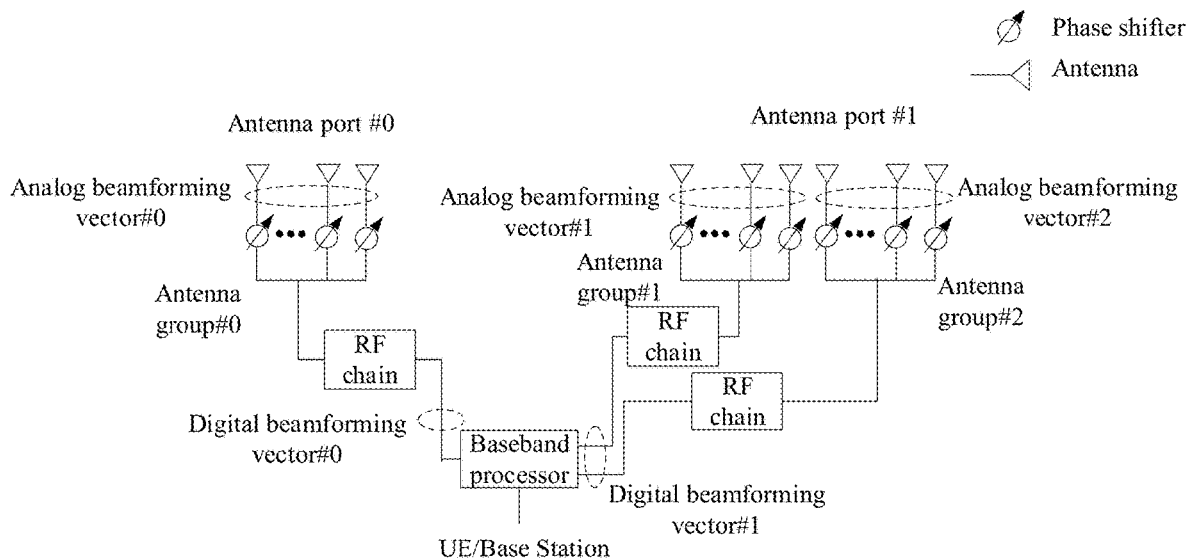
FIG. 10
FIG. 11

First precoding matrix
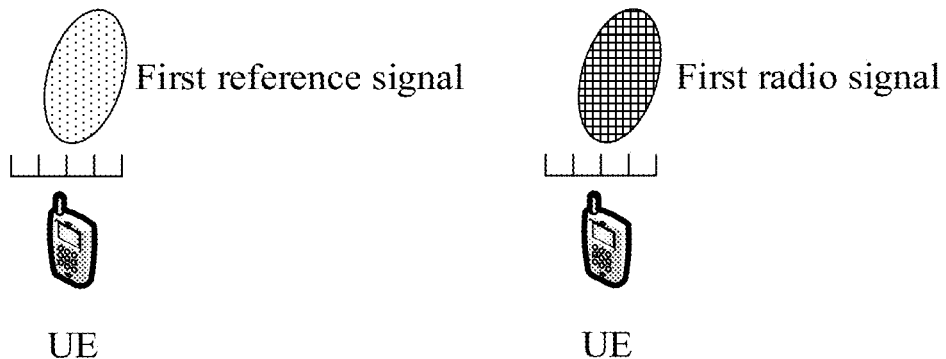
FIG. 12
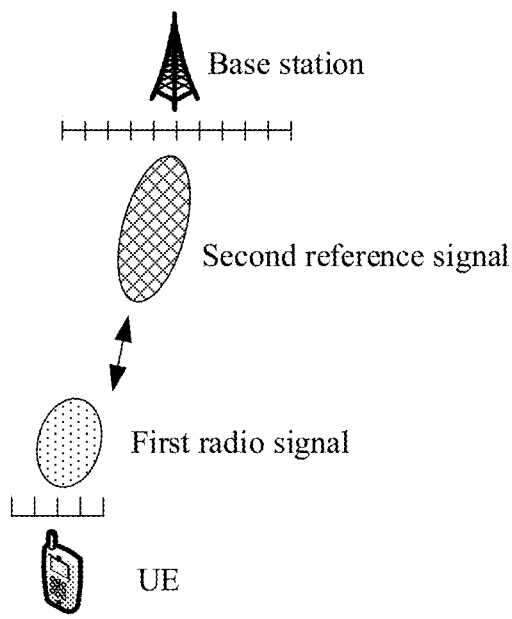
FIG. 13
FIG. 14
First information —— used to determine ——▶ K candidate coefficients
FIG. 15

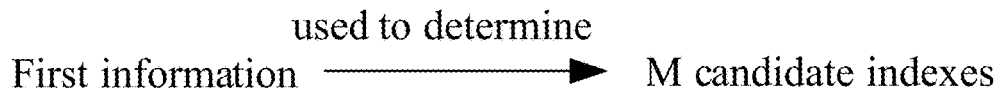

FIG. 16

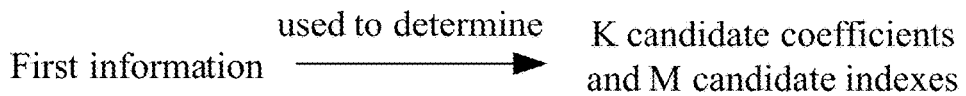

FIG. 17

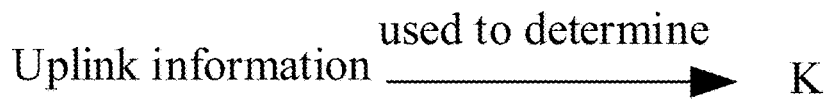

FIG. 18

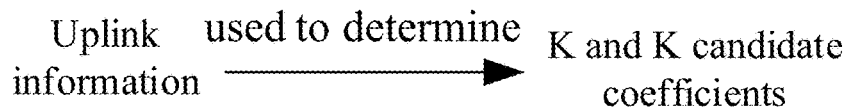

FIG. 19

First signaling ⟶ Second index

First-type signaling #0 ⟶ { first-type offset #0, first-type index #0}

⋮

First-type signaling #R-1 ⟶ { first-type offset #R-1, first-type index #R-1}

FIG. 20

Second power = min( first reference power, first power threshold )
First reference power = first component + second component + second coefficient × first pathloss + third component + a sum of R first-type offset(s)

FIG. 21

First signaling ⟶ Third index ⟶ Third reference signal resource

FIG. 22

METHOD AND DEVICE USED IN UE AND BASE STATION FOR WIRELESS COMMUNICATION

CROSS REFERENCE TO RELATED APPLICATIONS

This application is a continuation of the U.S. Ser. No. 17/324,123, filed on May 19, 2021, which is a continuation of the International patent Application No. PCT/CN2019/118141, filed Nov. 13, 2019, claims the priority benefit of Chinese Patent Application No. 201811403954.1, filed on Nov. 23, 2018, the full disclosure of which is incorporated herein by reference.

BACKGROUND

Technical Field

The present disclosure relates to methods and devices in wireless communication systems, and in particular to a method and a device in a wireless communication system that supports multi-antenna transmissions.

Related Art

Multi-antenna technology is a key technique in both 3rd Generation Partner Project (3GPP) Long-term Evolution (LTE) and New Radio (NR) systems. By configuring multiple antennas at a communication node, for instance, at a base station or a User Equipment (UE) to acquire extra spatial degrees of freedom. Multiple antennas can form different antenna ports through antenna virtualization, and same or different data can be transmitted on different antenna ports to improve transmission reliability or transmission efficiency. In NR system, a number of antenna ports supported by UE side reaches 4.

In NR system, relations among different antenna ports on the UE side can be divided into nonCoherent type, partialNonCoherent type and fullCoherent type. Precoding operation cannot be performed between noncoherent antenna ports and partialNonCoherent antenna ports, so that the UE only uses partial antenna ports for low-rank uplink transmissions.

SUMMARY

According to the definition in NR Release 15, when a number of non-zero power antenna ports used to transmit a Physical Uplink Shared Channel (PUSCH) is less than a total number of antenna ports configured to the PUSCH, a UE cannot transmit the PUSCH at full power. This constraint ensures the normal operation of the UE that cannot be transmitted by a single antenna at full power, but also limits the performance of the UE that can be transmitted by a single antenna at full power. How to optimize transmit power of the UE according to its capability is a problem to be solved. Inventors find through researches that in the case of multiple antenna panels configured to the UE, the above problem will be more complicated.

To address the above problem, the present disclosure provides a solution. It should be noted that the embodiments of a User Equipment in the present disclosure and the characteristics in the embodiments may be applied to a base station if no conflict is incurred, and vice versa. And the embodiments in the present disclosure and the characteristics in the embodiments can be arbitrarily combined if there is no conflict.

The present disclosure provides a method in a UE for wireless communications, comprising:
receiving a first signaling; and
transmitting a first radio signal;
herein, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, a problem to be solved in the present disclosure is when a UE is configured with multiple antenna panels, how to optimize transmit power according to the capability of each antenna panel. The above method solves the problem by establishing a connection between the first index and the first coefficient.

In one embodiment, the above method is characterized in that the first index indicates an antenna panel transmitting the first radio signal, and the first coefficient is a scaling factor of transmit power of the first radio signal. By establishing a connection between the first index and the first coefficient, the base station can optimize its transmit power according to capability of each antenna panel.

According to one aspect of the present disclosure, wherein the first signaling indicates a first precoding matrix, the first precoding matrix is a precoding matrix corresponding to the first radio signal.

According to one aspect of the present disclosure, comprising:
receiving first information;
herein, the first information is used to determine the K candidate coefficients.

According to one aspect of the present disclosure, comprising:
receiving first information;
herein, the first information is used to determine M candidate indexes, and the first index is one of the M candidate indexes, M being a positive integer greater than 1.

According to one aspect of the present disclosure, comprising:
receiving first information;
herein, the first information is used to determine the K candidate coefficients and M candidate indexes, and the first index is one of the M candidate indexes, M being a positive integer greater than 1.

According to one aspect of the present disclosure, comprising:
transmitting uplink information;
herein, the uplink information is used to determine the K.

According to one aspect of the present disclosure, comprising:
transmitting uplink information;
herein, the uplink information is used to determine the K and the K candidate coefficients.

According to one aspect of the present disclosure, comprising:
transmitting a first reference signal in a first reference signal resource;
herein, the first signaling is used to determine the first reference signal resource, and the first reference signal is used to determine a transmitting antenna port of the first radio signal.

According to one aspect of the present disclosure, comprising:
receiving a second reference signal in a second reference signal resource;
herein, the first signaling is used to determine the second reference signal resource, and a measurement performed on the second reference signal is used to determine a transmitting antenna port of the first radio signal.

According to one aspect of the present disclosure, comprising:
receiving R first-type signaling(s);
herein, the R first-type signaling(s) indicates (respectively indicate) R first-type offset(s), the second power is equal to a minimum value of first reference power and a first power threshold, and the first reference power is linearly related to a sum of the R first-type offset(s); the R is a positive integer; the R first-type signaling(s) is (are respectively) used to determine R first-type index(es), and the first signaling is used to determine a second index; each of value(s) of the R first-type index(es) is equal to the second index.

According to one aspect of the present disclosure, comprising:
receiving a third reference signal in a third reference signal resource;
herein, the first signaling is used to determine a third index, and the third index indicates the third reference signal resource; a measurement performed on the third reference signal is used to determine a first pathloss, the second power is equal to a minimum value of first reference power and a first power threshold, and the first reference power is linearly related to the first pathloss.

The present disclosure provides a method in a base station for wireless communications, comprising:
transmitting a first signaling; and
receiving a first radio signal;
herein, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

According to one aspect of the present disclosure, wherein the first signaling indicates a first precoding matrix, the first precoding matrix is a precoding matrix corresponding to the first radio signal.

According to one aspect of the present disclosure, comprising:
transmitting first information;
herein, the first information is used to determine the K candidate coefficients.

According to one aspect of the present disclosure, comprising:
transmitting first information;
herein, the first information is used to determine M candidate indexes, and the first index is one of the M candidate indexes, M being a positive integer greater than 1.

According to one aspect of the present disclosure, comprising:
transmitting first information;
herein, the first information is used to determine the K candidate coefficients and M candidate indexes, and the first index is one of the M candidate indexes, M being a positive integer greater than 1.

According to one aspect of the present disclosure, comprising:
receiving uplink information;
herein, the uplink information is used to determine the K.

According to one aspect of the present disclosure, comprising:
receiving uplink information;
herein, the uplink information is used to determine the K and the K candidate coefficients.

According to one aspect of the present disclosure, comprising:
receiving a first reference signal in a first reference signal resource;
herein, the first signaling is used to determine the first reference signal resource, and the first reference signal is used to determine a transmitting antenna port of the first radio signal.

According to one aspect of the present disclosure, comprising:
transmitting a second reference signal in a second reference signal resource;
herein, the first signaling is used to determine the second reference signal resource, and a measurement performed on the second reference signal is used to determine a transmitting antenna port of the first radio signal.

According to one aspect of the present disclosure, comprising:
transmitting R first-type signaling(s);
herein, the R first-type signaling(s) indicates (respectively indicate) R first-type offset(s), the second power is equal to a minimum value of first reference power and a first power threshold, and the first reference power is linearly related to a sum of the R first-type offset(s); the R is a positive integer; the R first-type signaling(s) is (are respectively) used to determine R first-type index(es), and the first signaling is used to determine a second index; each of value(s) of the R first-type index(es) is equal to the second index.

According to one aspect of the present disclosure, comprising:
transmitting a third reference signal in a third reference signal resource;
herein, the first signaling is used to determine a third index, and the third index indicates the third reference signal resource; a measurement performed on the third reference signal is used to determine a first pathloss, the second power is equal to a minimum value of first reference power and a first power threshold, and the first reference power is linearly related to the first pathloss.

The present disclosure provides a UE for wireless communications, comprising:
- a first receiver, which receives a first signaling; and
- a first transmitter, which transmits a first radio signal;
- herein, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

The present disclosure provides a base station for wireless communications, comprising:
- a second transmitter, which transmits a first signaling; and
- a second receiver, which receives a first radio signal;
- herein, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, the present disclosure has the following advantages over conventional schemes:
the base station optimizes transmit power of the PUSCH transmitted on different antenna panels according to capability of each antenna panel configured to the UE side, which not only ensures normal operation of the UE that cannot be transmitted by a single antenna at full power, but also improves performance of the UE that can be transmitted by a single antenna at full power.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrate a schematic diagram of relations among first power, second power and a first coefficient according to one embodiment of the present disclosure.

FIG. 7 illustrates a schematic diagram of a first signaling according to one embodiment of the present disclosure.

FIG. 8 illustrates a schematic diagram of a first signaling according to one embodiment of the present disclosure.

FIG. 9 illustrates a schematic diagram of a first signaling according to one embodiment of the present disclosure.

FIG. 10 illustrates a schematic diagram of relations among a first coefficient and K candidate coefficients according to one embodiment of the present disclosure.

FIG. 11 illustrates a schematic diagram of antenna ports according to one embodiment of the present disclosure.

FIG. 12 illustrates a schematic diagram of a first precoding matrix according to one embodiment of the present disclosure.

FIG. 13 illustrates a schematic diagram of a relation between a first reference signal and a first radio signal according to one embodiment of the present disclosure.

FIG. 14 illustrates a schematic diagram of a relation between a second reference signal and a first radio signal according to one embodiment of the present disclosure.

FIG. 15 illustrates a schematic diagram of first information being used to determine K candidate coefficients according to one embodiment of the present disclosure.

FIG. 16 illustrates a schematic diagram of first information being used to determine M candidate indexes according to one embodiment of the present disclosure.

FIG. 17 illustrates a schematic diagram of first information being used to determine K candidate coefficients and M candidate indexes according to one embodiment of the present disclosure.

FIG. 18 illustrates a schematic diagram of uplink information being used to determine K according to one embodiment of the present disclosure.

FIG. 19 illustrates a schematic diagram of uplink information being used to determine K and K candidate coefficients according to one embodiment of the present disclosure.

FIG. 20 illustrates a schematic diagram of R first-type signaling(s) according to one embodiment of the present disclosure.

FIG. 21 illustrates a schematic diagram of second power according to one embodiment of the present disclosure.

FIG. 22 illustrates a schematic diagram of a first signaling being used to determine a third reference signal resource according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
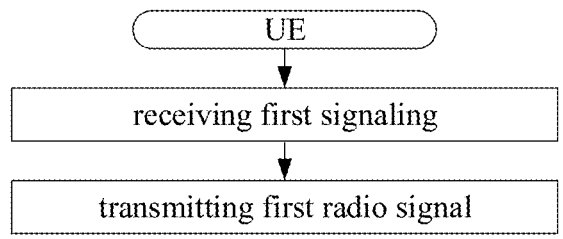
FIG. 1 illustrates a flowchart of a first signaling and a first radio signal according to one embodiment of the present disclosure.

Embodiment 1 illustrates a flowchart of a first signaling and a first radio signal; as shown in FIG. 1.

In Embodiment 1, the UE in the present disclosure receives a first signaling; transmits a first radio signal; herein, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, the first signaling indicates scheduling information of the first radio signal.

In one embodiment, the first signaling explicitly indicates scheduling information of the first radio signal.

In one embodiment, the scheduling information of the first radio signal includes at least one of occupied time-domain resources, occupied frequency-domain resources, a Modulation and Coding Scheme (MCS), configuration information of DeModulation Reference Signals (DMRS), a Hybrid Automatic Repeat reQuest (HARD) process number, a Redundancy Version (RV), a New Data Indicator (NDI), or corresponding Spatial Rx parameters.

In one embodiment, configuration information of a DMRS includes one or more of occupied time-domain resources, occupied frequency-domain resources, occupied code-domain resources, an RS sequence, a mapping mode, a DMRS type, a cyclic shift, an Orthogonal Cover Code (OCC), $w_f(k')$, and $w_t(l')$. The $w_f(k')$ and the $w_t(l')$ are spread spectrum sequences in frequency domain and time domain, the specific meaning of the $w_f(k')$ and the $w_t(l')$ can be found in 3GPP TS38.211, section 6.4.1.

In one embodiment, the first signaling indicates the first index.

In one embodiment, the first signaling explicitly indicates the first index.

In one embodiment, the first signaling implicitly indicates the first index.

In one embodiment, the first index is a non-negative integer.

In one embodiment, the first index is a Sounding reference signal Resource Indicator (SRI).

In one embodiment, the first index is an SRS-ResourceId.

In one embodiment, the first index is an SRS-ResourceSetId.

In one embodiment, the first index is an SSB-Index.

In one embodiment, the first index is an NZP-CSI-RS-ResourceId.

In one embodiment, the first index is an NZP-CSI-RS-ResourceSetId.

In one embodiment, the first index is an SRI-PUSCH-PowerControlId.

In one embodiment, the specific meaning of the SRS-ResourceId can be found in 3GPP TS38.331.

In one embodiment, the specific meaning of the SRS-ResourceSetId can be found in 3GPP TS38.331.

In one embodiment, the specific meaning of the SSB-Index can be found in 3GPP TS38.331.

In one embodiment, the specific meaning of the NZP-CSI-RS-ResourceId can be found in 3GPP TS38.331.

In one embodiment, the specific meaning of the NZP-CSI-RS-ResourceSetId can be found in 3GPP TS38.331.

In one embodiment, the specific diagram of the SRI-PUSCH-PowerControlId can be found in 3GPP TS38.331.

In one embodiment, the first index is used to identify a Sounding Reference Signal (SRS) resource.

In one embodiment, the first index is used to identify an SRS resource set.

In one embodiment, the first index is used to identify an antenna group, and the antenna group comprises at least one antenna.

In one embodiment, the first index is used to identify a beam group, and the beam group comprises at least one beam.

In one embodiment, the first index is used to identify a spatialRelationInfo group, and the spatialRelationInfo group comprises at least one piece of spatialRelationInfo.

In one embodiment, the specific meaning of the spatialRelationInfo can be found in 3GPP TS38.331.

In one embodiment, the first index is used to identify a downlink reference signal resource group, and the downlink reference signal resource group comprises at least one downlink reference signal resource.

In one subembodiment of the above embodiment, at least one downlink reference signal resource in the at least one downlink reference signal resource is reserved for a Channel-State Information Reference Signal (CSI-RS).

In one subembodiment of the above embodiment, at least one downlink reference signal resource in the at least one downlink reference signal resource is reserved for a Synchronization Signal/Physical Broadcast Channel block (SS/PBCH Block).

In one embodiment, the first index is used to identify a Transmission Configuration Indication (TCI) state group, and the TCI state group comprises at least one TCI state.

In one embodiment, the specific meaning of the TCI state can be found in 3GPP TS38.214 and 3GPP TS38.331.

In one embodiment, the first index being used to determine a transmitting antenna port of the first radio signal includes: the first index is used to determine an antenna transmitting the first radio signal.

In one embodiment, the first index being used to determine a transmitting antenna port of the first radio signal includes: the first index is used to determine an antenna panel transmitting the first radio signal.

In one subembodiment of the above embodiment, different antenna panels are connected to a baseband processor through different Radio Frequency (RF) chains.

In one embodiment, the first index being used to determine a transmitting antenna port of the first radio signal includes: the first index is used to determine an antenna group transmitting the first radio signal, and the antenna group comprises at least one antenna.

In one subembodiment of the above embodiment, different antenna groups are connected to a baseband processor through different RF chains.

In one embodiment, the first index being used to determine a transmitting antenna port of the first radio signal includes: the first index is used to determine at least one transmitting antenna port of the first radio signal.

In one embodiment, the first index being used to determine a transmitting antenna port of the first radio signal includes: the first index is used to determine all transmitting antenna ports of the first radio signal.

In one embodiment, the first index being used to determine a transmitting antenna port of the first radio signal includes: the first index is used to determine a spatial domain transmission filter of the first radio signal.

In one embodiment, the first index being used to determine a transmitting antenna port of the first radio signal includes: the first index is used to determine a precoding matrix of the first radio signal.

In one embodiment, the first radio signal comprises M1 sub-signals, M1 being a positive integer greater than 1, and the M1 sub-signals are respectively transmitted on M1 antenna ports.

In one subembodiment of the above embodiment, the first index being used to determine a transmitting antenna port of the first radio signal includes: the first index is used determine a spatial domain transmission filter of at least one of the M1 sub-signals.

In one subembodiment of the above embodiment, the first index being used to determine a transmitting antenna port of the first radio signal includes: the first index is used to determine a precoding matrix of at least one of the M1 sub-signals.

In one embodiment, the PUSCH is a Physical Uplink Shared Channel.

In one embodiment, a number of antenna ports configured to the PUSCH bearing the first radio signal is equal to $\rho$, and the specific meaning of the $\rho$ can be found in 3GPP TS38.211 (V15.3.0), section 6. 3. 1. 5.

In one embodiment, antenna ports configured to the PUSCH bearing the first radio signal are respectively antenna ports $\{p_0 \ldots, p_{\rho-1}\}$, and the specific meaning of the antenna ports $\{p_0, \ldots, p_{\rho-1}\}$ can be found in 3GPP TS38.211 (V15.3.0), section 6. 3. 1. 5.

In one embodiment, a number of transmitting antenna ports of the first radio signal is equal to v, the v is a layer number of the first radio signal, and the specific meaning of the v can be found in 3GPP TS38.211(V15.3.0), section 6. 3. 1. 5.

In one embodiment, transmitting antenna ports of the first radio signal are respectively antenna ports $\{0 \ldots v-1\}$, and the specific meaning of the antenna ports $\{0 \ldots v-1\}$ can be found in 3GPP TS38.214 (V15.3.0), section 6. 1. 1. 1 and 3GPP TS38.211 (V15.3.0), section 6. 3. 1. 5.

In one embodiment, the transmitting antenna port of the first radio signal is formed by a non-zero-power antenna port occupied by the first radio signal among the antenna ports configured to a PUSCH bearing the first radio signal through precoding.

In one embodiment, the transmitting antenna port of the first radio signal is formed by a non-zero-power antenna port occupied by the first radio signal among the antenna ports configured to a PUSCH bearing the first radio signal through antenna port virtualization.

In one embodiment, the transmitting antenna port of the first radio signal is formed by a non-zero-power antenna port occupied by the first radio signal among the antenna ports configured to a PUSCH bearing the first radio signal through precoding performed by the first precoding matrix in the present disclosure.

In one embodiment, at least one of the K candidate coefficients is greater than a ratio of the first value to a number of antenna ports configured to a PUSCH bearing the first radio signal.

In one embodiment, any of the K candidate coefficients being related to a first value includes: the K candidate coefficients are respectively equal to a minimum value among K reference candidate coefficients and 1, and each of the K reference candidate coefficients is linearly related to the first value.

In one embodiment, the first coefficient being related to the first index includes: the first index is used to determine the first coefficient out of the K candidate coefficients.

Embodiment 2

Figure 2:
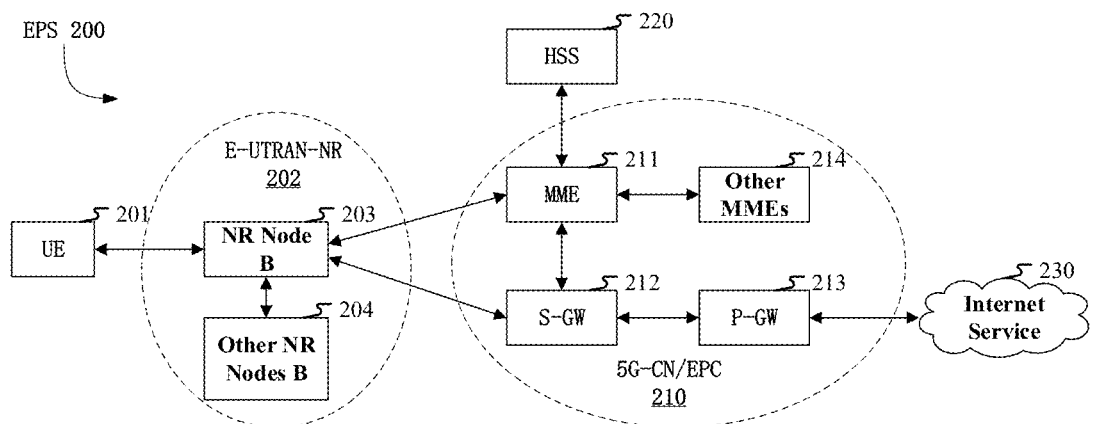
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The EPS 200 may comprise one or more UEs 201, an E-UTRAN-NR 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201-oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrowband physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises an MME 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the gNB 203 corresponds to the base station in the present disclosure. In one embodiment, the UE 201 corresponds to the UE in the present disclosure.

In one embodiment, the gNB 203 supports multi-antenna transmissions.

In one embodiment, the UE 201 supports multi-antenna transmissions.

Embodiment 3

Figure 3:
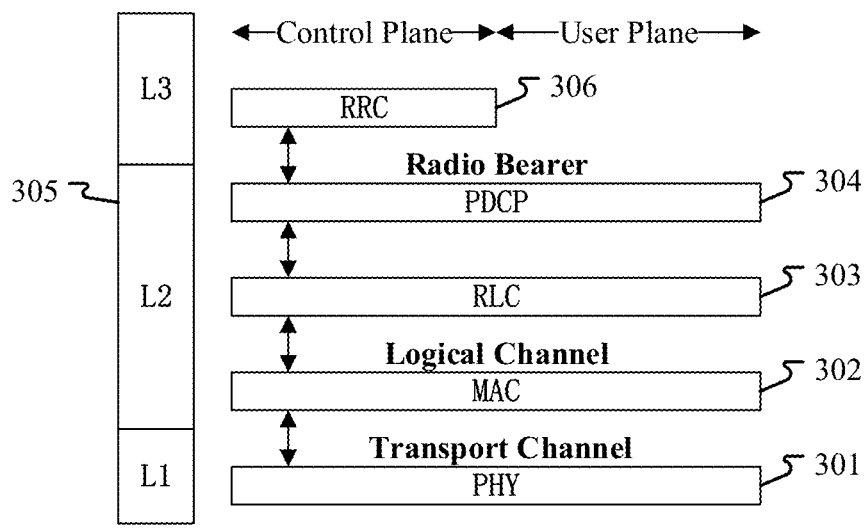
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first radio signal in the present disclosure is generated by the PHY 301.

In one embodiment, the first information in the present disclosure is generated by the RRC sublayer 306.

In one embodiment, the first information in the present disclosure is generated by the MAC sublayer 302.

In one embodiment, the uplink information in the present disclosure is generated by the PHY 301.

In one embodiment, the first reference signal in the present disclosure is generated by the PHY 301.

In one embodiment, the second reference signal in the present disclosure is generated by the PHY 301.

In one embodiment, the third reference signal in the present disclosure is generated by the PHY 301.

In one embodiment, the R first-type signaling(s) in the present disclosure is(are) generated by the PHY 301.

Embodiment 4

Figure 4:
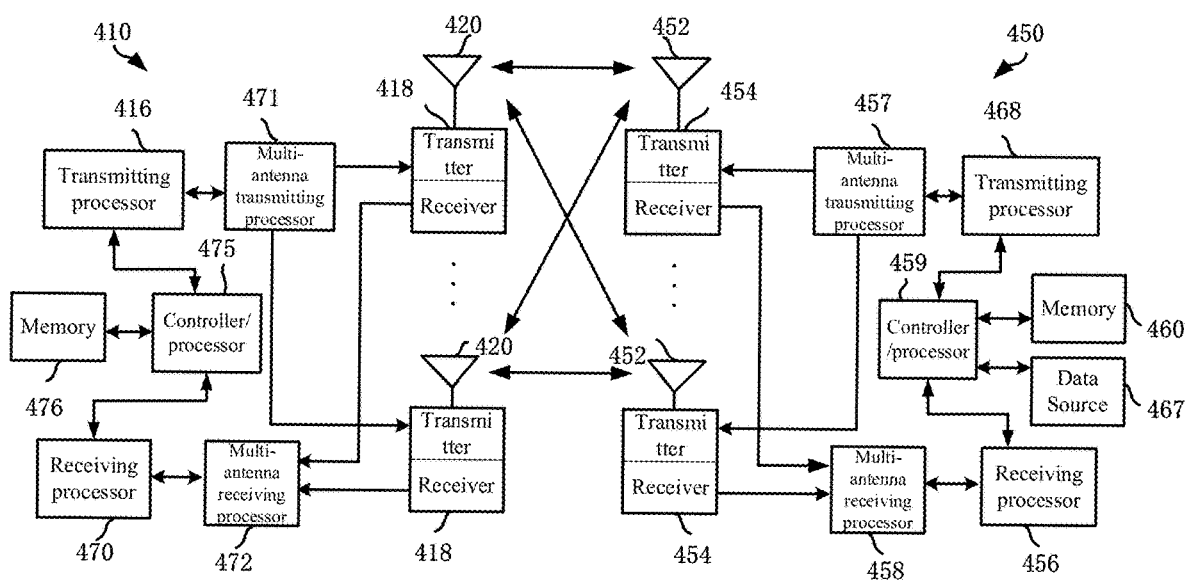
FIG. 4 illustrates a schematic diagram of an NR node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory comprises computer program codes; the at least one memory and the computer program codes are configured to be used in collaboration with the at least one processor. The UE 450 at least: receives the first signaling in the present disclosure; and transmits the first radio signal in the present disclosure. Herein, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, the UE 450 comprises a memory that stores a computer readable instruction program. The computer readable instruction program generates an action when executed by at least one processor. The action includes: receiving the first signaling in the present disclosure; and transmitting the first radio signal in the present disclosure. Herein, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, the gNB 410 comprises at least one processor and at least one memory. The at least one memory comprises computer program codes; the at least one memory and the computer program codes are configured to be used in collaboration with the at least one processor. The gNB 410 at least: transmits the first signaling in the present disclosure; and receives the first radio signal in the present disclosure. Herein, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, the gNB 410 comprises a memory that stores a computer readable instruction program. The computer readable instruction program generates an action when executed by at least one processor. The action includes: transmitting the first signaling in the present disclosure; and receiving the first radio signal in the present disclosure. Herein, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, the gNB 410 corresponds to the base station in the present disclosure.

In one embodiment, the UE 450 corresponds to the UE in the present disclosure.

In one embodiment, at least one of the antenna 452, the receiver 454, the receiving processor 456, the multi-antenna receiving processor 458, the controller/processor 459, the memory 460, or the data source 467 is used to receive the first signaling in the present disclosure; at least one of the antenna 420, the transmitter 418, the transmitting processor 416, the multi-antenna transmitting processor 471, the controller/processor 475, or the memory 476 is used to transmit the first signaling in the present disclosure.

In one embodiment, at least one of the antenna 420, the receiver 418, the receiving processor 470, the multi-antenna receiving processor 472, the controller/processor 475, or the memory 476 is used for receiving the first radio signal in the present disclosure; at least one of the antenna 452, the transmitter 454, the transmitting processor 468, the multi-antenna transmitting processor 457, the controller/processor 459, the memory 460, or the data source 467 is used to transmit the first radio signal in the present disclosure.

In one embodiment, at least one of the antenna 452, the receiver 454, the receiving processor 456, the multi-antenna receiving processor 458, the controller/processor 459, the memory 460, or the data source 467 is used to receive the first information in the present disclosure; at least one of the antenna 420, the transmitter 418, the transmitting processor 416, the multi-antenna transmitting processor 471, the controller/processor 475, or the memory 476 is used to transmit the first information in the present disclosure.

In one embodiment, at least one of the antenna 420, the receiver 418, the receiving processor 470, the multi-antenna receiving processor 472, the controller/processor 475, or the memory 476 is used to receive the uplink information in the present disclosure; at least one of the antenna 452, the transmitter 454, the transmitting processor 468, the multi-antenna transmitting processor 457, the controller/processor 459, the memory 460, or the data source 467 is used to transmit the uplink information in the present disclosure.

In one embodiment, at least one of the antenna 420, the receiver 418, the receiving processor 470, the multi-antenna receiving processor 472, the controller/processor 475, or the memory 476 is used to receive the first reference signal in the present disclosure in the first reference signal resource in the present disclosure; at least one of the antenna 452, the transmitter 454, the transmitting processor 468, the multi-antenna transmitting processor 457, the controller/processor 459, the memory 460, or the data source 467 is used to transmit the first reference signal in the present disclosure on the first reference signal resource in the present disclosure.

In one embodiment, at least one of the antenna 452, the receiver 454, the receiving processor 456, the multi-antenna receiving processor 458, the controller/processor 459, the memory 460, or the data source 467 is used to receive the second reference signal in the present disclosure on the second reference signal resource in the present disclosure; at least one of the antenna 420, the receiver 418, the receiving processor 416, the multi-antenna transmitting processor 471, the controller/processor 475, or the memory 476 is used to transmit the second reference signal in the second reference signal resource in the present disclosure.

In one embodiment, at least one of the antenna 452, the receiver 454, the receiving processor 456, the multi-antenna receiving processor 458, the controller/processor 459, the memory 460, or the data source 467 is used to receive the R first-type signaling(s) in the present disclosure; at least one of the antenna 420, the transmitter 418, the transmitting processor 416, the multi-antenna transmitting processor 471, the controller/processor 475, or the memory 476 is used to transmit the R first-type signaling(s) in the present disclosure.

In one embodiment, at least one of the antenna 452, the receiver 454, the receiving processor 456, the multi-antenna receiving processor 458, the controller/processor 459, the memory 460, or the data source 467 is used to receive the third reference signal in the present disclosure on the third reference signal resource in the present disclosure; at least one of the antenna 420, the receiver 418, the receiving processor 416, the multi-antenna transmitting processor 471, the controller/processor 475, or the memory 476 is used to transmit the third reference signal in the present disclosure on the third reference signal resource in the present disclosure.

Embodiment 5

Figure 5:
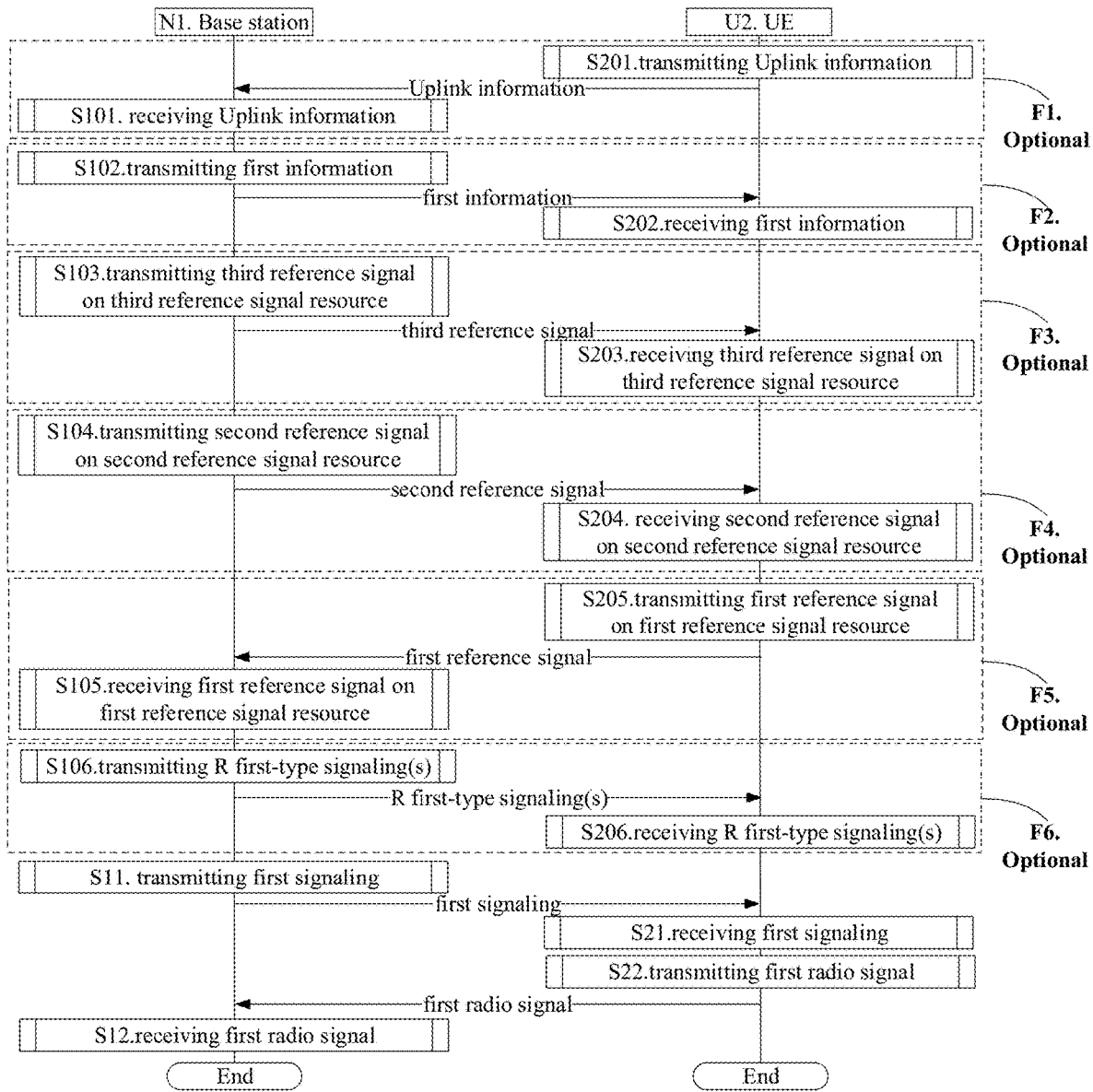
FIG. 5 illustrates a flowchart of transmissions according to one embodiment of the present disclosure.

Embodiment 5 illustrates a flowchart of wireless transmissions, as shown in FIG. 5. In FIG. 5, a base station N1 is a maintenance base station for a serving cell of a UE U2. In FIG. 5, each step in block F1 to block F6 is optional.

The N1 receives uplink information in step S101; transmits first information in step S102; transmits a third reference signal in a third reference signal resource in step S103; transmits a second reference signal in a second reference signal resource in step S104; receives a first reference signal in a first reference signal resource in step S105; transmits R first-type signaling(s) in step S106; transmits a first signaling in step S11; and receives a first radio signal in step S12.

The U2 transmits uplink information in step S201; receives first information in step S202; receives a third reference signal in a third reference signal resource in step S203; receives a second reference signal in a second reference signal resource in step S204; transmits a first reference signal in a first reference signal resource in step S205; receives R first-type signaling(s) in step S206; receives a first signaling in step S21; and transmits a first radio signal in step S22.

In Embodiment 5, the first signaling comprises scheduling information of the first radio signal; the first signaling is used by the U2 to determine a first index, and the first index is used by the U2 to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, the N1 is the base station in the present disclosure.

In one embodiment, the U2 is the UE in the present disclosure.

In one embodiment, wherein the first signaling indicates a first precoding matrix, the first precoding matrix is a precoding matrix corresponding to the first radio signal.

In one embodiment, the first information is used by the U2 to determine the K candidate coefficients.

In one embodiment, the first information is used by the U2 to determine M candidate indexes, the first index is one of the M candidate indexes, M being a positive integer greater than 1.

In one embodiment, the first information is used by the U2 to determine the K candidate coefficients and M candidate indexes, the first index is one of the M candidate indexes, M being a positive integer greater than 1.

In one embodiment, the uplink information is used by the N1 to determine the K.

In one embodiment, the uplink information is used by the N1 to determine the K and the K candidate coefficients.

In one embodiment, the first signaling is used by the U2 to determine the first reference signal resource, and the first reference signal is used by the U2 to determine a transmitting antenna port of the first radio signal.

In one embodiment, the first signaling is used by the U2 to determine the second reference signal resource, and a measurement performed on the second reference signal is used by the U2 to determine a transmitting antenna port of the first radio signal.

In one embodiment, the R first-type signaling(s) indicates (respectively indicate) R first-type offset(s), the second power is equal to a minimum value of first reference power and a first power threshold, and the first reference power is linearly related to a sum of the R first-type offset(s); the R is a positive integer; the R first-type signaling(s) is (are respectively) used by the U2 to determine R first-type index(es), and the first signaling is used by the U2 to determine a second index; each of value(s) of the R first-type index(es) is equal to the second index.

In one embodiment, the first signaling is used by the U2 to determine a third index, and the third index indicates the third reference signal resource; a measurement performed on the third reference signal is used by the U2 to determine a first pathloss, the second power is equal to a minimum value of first reference power and a first power threshold, and the first reference power is linearly related to the first pathloss.

In one embodiment, an end time of time-domain resources occupied by at least one of the R first-type signaling(s) is earlier than a start time of time-domain resources occupied by the first reference signal.

In one embodiment, an end time of time-domain resources occupied by at least one of the R first-type signaling(s) is earlier than a start time of time-domain resources occupied by the second reference signal.

In one embodiment, an end time of time-domain resources occupied by at least one of the R first-type signaling(s) is earlier than a start time of time-domain resources occupied by the third reference signal.

In one embodiment, the first signaling is one of the R first-type signaling(s).

In one embodiment, the first signaling is transmitted on a downlink physical layer control channel (i.e., a downlink channel that is only capable of carrying a physical layer signaling).

In one embodiment, the downlink physical-layer control channel is a Physical Downlink Control CHannel (PDCCH).

In one embodiment, the downlink physical-layer control channel is a short PDCCH (sPDCCH).

In one embodiment, the downlink physical layer control channel is a New Radio PDCCH (NR-PDCCH).

In one embodiment, the downlink physical layer control channel is a Narrow Band PDCCH (NB-PDCCH).

In one embodiment, the first radio signal is transmitted on a PUSCH.

In one embodiment, the first radio signal is transmitted on an uplink physical layer data channel (i.e., an uplink channel capable of carrying physical layer data).

In one embodiment, a transmission channel corresponding to the first radio signal is an Uplink Shared Channel (UL-SCH).

In one embodiment, the first information is transmitted on a downlink physical layer data channel (i.e., a downlink channel capable of carrying physical layer data).

In one subembodiment of the above embodiment, the downlink physical layer data channel is a Physical Downlink Shared CHannel (PDSCH).

In one subembodiment of the above embodiment, the downlink physical layer data channel is a short PDSCH (sPDSCH).

In one subembodiment of the above embodiment, the downlink physical layer data channel is a New Radio PDSCH (NR-PDSCH).

In one subembodiment of the above embodiment, the downlink physical layer data channel is a Narrow Band PDSCH (NB-PDSCH).

In one embodiment, the uplink information is transmitted on an uplink physical layer data channel (that is, an uplink channel capable of carrying physical layer data).

In one subembodiment of the above embodiment, the uplink physical layer data channel is a PUSCH.

In one subembodiment, the uplink physical layer data channel is a short Physical Uplink Shared Channel (sPUSCH).

In one subembodiment of the above embodiment, the uplink physical layer data channel is a New Radio PUSCH (NR-PUSCH).

In one subembodiment of the above embodiment, the uplink physical layer data channel is a Narrow Band PUSCH (NB-PUSCH).

In one embodiment, the R first-type signaling(s) is (are respectively) transmitted on R downlink physical layer control channel(s) (i.e., a downlink channel that is only capable of carrying a physical layer signaling).

Embodiment 6

Embodiment 6 illustrates a schematic diagram of relations among first power, second power and a first coefficient; as shown in FIG. 6.

In Embodiment 6, a linear value of the first power is equal to a product of a linear value of the second power and the first coefficient.

In one embodiment, the first power is measured by dBm.

In one embodiment, the second power is measured by dBm.

In one embodiment, a linear value of the first power is equal to ×1 power of 10, and the ×1 is equal to the first power divided by 10.

In one embodiment, a linear value of the second power is equal to ×2 power of 10, and the ×2 is equal to the second power divided by 10.

In one embodiment, the first coefficient is a positive real number not greater than 1.

In one embodiment, the second power is $P_{PUSCH,b,f,c}(i,j,q_d,l)$, the $P_{PUSCH,b,f,c}(i,j,q_d,l)$ is transmit power on a PUSCH in a PUSCH transmission period indexed as i on a Bandwidth Part (BWP) indexed as b on a carrier indexed as f of a serving cell indexed as c, the j is an index of parameter configuration, the $q_d$ is an index of a reference signal resource, the l is an index of a power control adjustment state, the first radio signal is transmitted on a BWP indexed as b on a carrier indexed as f of a serving cell indexed as c. The specific meaning of the $P_{PUSCH,b,f,c}(i,j,q_d,l)$ can be found in 3GPP TS38. 213.

Embodiment 7

Embodiment 7 illustrates a schematic diagram of a first signaling; as shown in FIG. 7.

In Embodiment 7, the first signaling comprises a first field, the first field in the first signaling indicates the first reference signal resource in the present disclosure, and the first reference signal resources is reserved for the first reference signal in the present disclosure; the first field in the first signaling is used to determine the first index in the present disclosure.

In one embodiment, the first signaling is a physical-layer signaling.

In one embodiment, the first signaling is a dynamic signaling.

In one embodiment, the first signaling is a layer 1 (L1) signaling.

In one embodiment, the first signaling is a L1 control signaling.

In one embodiment, the first signaling is a dynamic signaling used for UpLink Grant.

In one embodiment, the first signaling comprises Downlink Control Information (DCI).

In one embodiment, the first signaling comprises DCI for UpLink Grant.

In one embodiment, the first signaling is UE-specific.

In one embodiment, the first field in the first signaling comprises part or all of information in an SRS resource indicator field.

In one embodiment, the first field in the first signaling is an SRS resource indicator field.

In one embodiment, the specific meaning of the SRS resource indicator field can be found in 3GPP TS38. 212, section 7. 3. 1.

In one embodiment, the first reference signal is an uplink reference signal.

In one embodiment, the first reference signal comprises an SRS.

In one embodiment, the first field in the first signaling indicates the first index.

In one embodiment, the first field in the first signaling explicitly indicates the first index.

In one embodiment, the first index is an index of the first reference signal resource.

In one embodiment, the first field in the first signaling implicitly indicates the first index.

In one embodiment, the first reference signal resource is associated with the second reference signal resource in the present disclosure, and the second reference signal resource is reserved for the second reference signal in the present disclosure; the second reference signal resource is used to determine the first index.

In one subembodiment of the above embodiment, the first index is an index of the second reference signal resource.

In one subembodiment of the above embodiment, the second reference signal resource belongs to a second reference signal resource set, the second reference signal resource set comprises at least one reference signal resource, and the first index is an index of the second reference signal resource set.

In one subembodiment of the above embodiment, the second reference signal is a downlink reference signal.

In one subembodiment of the above embodiment, the second reference signal comprises a CSI-RS.

In one subembodiment of the above embodiment, the second reference signal comprises an SS/PBCH block.

In one subembodiment of the above embodiment, the first reference signal resource being associated with a second reference signal resource includes: the UE in the present disclosure uses a same spatial-domain filter to transmit the first reference signal and receive the second reference signal.

Embodiment 8

Embodiment 8 illustrates a schematic diagram of a first signaling; as shown in FIG. 8.

In Embodiment 8, the first signaling comprises a first field and a second field. The first field in the first signaling indicates the first reference signal resource in the present disclosure, and the second field in the first signaling indicates the first precoding matrix in the present disclosure. The first field in the first signaling is used to determine the first index in the present disclosure.

In one embodiment, the second field in the first signaling comprises all or partial information of a precoding information and number of layers field.

In one embodiment, the second field in the first signaling is a Precoding information and number of layers field.

In one embodiment, the specific meaning of the Precoding information and number of layers field can be found in 3GPP TS38.212, section 7. 3. 1.

Embodiment 9

Embodiment 9 illustrates a schematic diagram of a first signaling; as shown in FIG. 9.

In Embodiment 9, the first signaling is used to determine the first index in the present disclosure.

In one embodiment, a signaling format of the first signaling is used to determine the first index.

In one embodiment, a signaling format of the first signaling is a signaling format in a first format set, the first format set comprises at least one signaling format, and the first format set comprises DCI format 0_0 and DCI format 0_1.

In one embodiment, the specific meaning of the DCI format 0_0 and the DCI format 0_1 can be found in 3 GPP TS38.212, section 7.3.1.

In one embodiment, a Physical Uplink Control CHannel (PUCCH) resource with a smallest index configured on a first BWP in a first serving cell is used to determine the first index, and the first radio signal in the present disclosure is transmitted on the first BWP in the first serving cell.

In one embodiment, a fourth reference signal resource is associated with a PUCCH resource with a smallest index configured on a first BWP in a first serving cell, the first index is an index of the fourth reference signal resource, and the first radio signal in the present disclosure is transmitted on the first BWP in the first serving cell.

In one subembodiment of the above embodiment, an index of the fourth reference signal resource is an SRS-ResourceId.

In one subembodiment of the above embodiment, an index of the fourth reference signal resource is an SRS-ResourceSetId.

In one subembodiment of the above embodiment, an index of the fourth reference signal resource is an SSB-Index.

In one subembodiment of the above embodiment, an index of the fourth reference signal resource is an NZP-CSI-RS-Re sourceId.

In one subembodiment of the above embodiment, an index of the fourth reference signal resource is an NZP-CSI-RS-ResourceSetId.

In one subembodiment of the above embodiment, the UE in the present disclosure uses a same spatial domain filter to transmit a radio signal in the fourth reference signal resource and transmit a PUCCH on a PUCCH resource with a smallest index configured on the first BWP in the first serving cell.

In one subembodiment of the above embodiment, the UE in the present disclosure uses a same spatial domain filter to receive a radio signal in the fourth reference signal resource and transmit a PUCCH on a PUCCH resource with a smallest index configured on the first BWP in the first serving cell.

In one embodiment, a PUCCH-SpatialRelationInfo IE indicates the first index.

In one embodiment, a referenceSignal field in a PUCCH-SpatialRelationInfo IE indicates the first index.

In one embodiment, the specific meaning of the PUCCH-SpatialRelationInfo IE can be found in 3GPP TS38.331.

In one embodiment, the specific meaning of the referenceSignal field can be found in 3GPP TS38.331.

Embodiment 10

Embodiment 10 illustrates a schematic diagram of a relation between a first coefficient and K candidate coefficients; as shown in FIG. 10.

In Embodiment 10, the first coefficient is one of the K candidate coefficients. In FIG. 10, indexes of the K candidate coefficients are respectively #0, . . . , #K−1.

In one embodiment, the first coefficient is a positive real number not greater than 1.

In one embodiment, any of the K candidate coefficients is a positive real number not greater than 1.

In one embodiment, the K is equal to 2.

In one embodiment, the K is greater than 2.

In one embodiment, the first coefficient is greater than a ratio of the first value in the present disclosure to a number of antenna ports configured to a PUSCH bearing the first radio signal.

In one embodiment, the first coefficient is equal to a ratio of the first value in the present disclosure to a number of antenna ports configured to a PUSCH bearing the first radio signal.

In one embodiment, if the first index is an index in a first index set, the first coefficient is greater than a ratio of the first value in the present disclosure to a number of antenna ports configured to a PUSCH bearing the first radio signal; if the first index is an index in a second index set, the first coefficient is equal to a ratio of the first value in the present disclosure to a number of antenna ports configured to a PUSCH bearing the first radio signal; the first index set and the second index set respectively comprise at least one index.

In one subembodiment of the above embodiment, any index in the first index set does not belong to the second index set, and any index in the second index set does not belong to the first index set.

In one subembodiment of the above embodiment, any index in the first index set and the second index set is one of the M candidate indexes in the present disclosure.

In one embodiment, at least one of the K candidate coefficients is greater than a ratio of the first value in the present disclosure to a number of antenna ports configured to a PUSCH bearing the first radio signal.

In one embodiment, the K candidate coefficients are respectively equal to a minimum value among K reference candidate coefficients and 1, and each of the K reference candidate coefficients is linearly related to the first value in the present disclosure.

In one embodiment, the K candidate coefficients are respectively equal to a minimum value among K reference candidate coefficients and 1, and each of the K reference candidate coefficients is linearly related to the first value in the present disclosure; linear coefficients among the K reference candidate coefficients and the first value are respectively equal to ratios of K scaling factors to a number of antenna ports configured to the PUSCH bearing the first radio signal; the K scaling factors are real numbers not less than 1.

In one subembodiment of the above embodiment, at least one of the K scaling coefficients is equal to 1.

In one subembodiment of the above embodiment, at least one of the K scaling coefficients is greater than 1.

In one subembodiment of the above embodiment, the first information in the present disclosure indicates the K scaling coefficients.

In one subembodiment of the above embodiment, the K reference candidate coefficients are respectively equal to a product of the K scaling factors and a first ratio, and the first ratio is equal to a ratio of the first value to a number of the antenna ports configured to the PUSCH bearing the first radio signal.

In one subembodiment of the above embodiment, the uplink information in the present disclosure is used to determine the K scaling factors.

In one embodiment, the uplink information in the present disclosure is used to determine the K candidate coefficients.

In one embodiment, the uplink information in the present disclosure is used by a transmitter of the first signaling to determine the K candidate coefficients.

In one embodiment, the first index in the present disclosure is used to determine the first coefficient out of the K candidate coefficients.

In one embodiment, the K candidate coefficients respectively correspond to K index sets, and any of the K index sets comprises at least one index; the first index in the present disclosure is an index in a first target index set in the K index sets, and the first coefficient is equal to one of the K candidate coefficients corresponding to the first target index set.

In one subembodiment of the above embodiment, any index in the K index sets is one of the M candidate indexes in the present disclosure.

In one subembodiment of the above embodiment, any of the M candidate indexes in the present disclosure belongs to one of the K index sets.

In one subembodiment of the above embodiment, there does not exist any of the M candidate indexes simultaneously belonging to two of the K index sets.

Embodiment 11

Embodiment 11 illustrates a schematic diagram of an antenna port, as shown in FIG. 11.

In Embodiment 11, a given antenna port is formed by superposition of antennas of at least one antenna group through antenna virtualization; an antenna group comprises at least one antenna. An antenna group is connected to a baseband processor via a Radio Frequency (RF) chain, and different antenna groups correspond to different RF chains. Mapping coefficients from all antennas of at least one antenna group comprised in the given antenna port to the given antenna port constitute a beamforming vector corresponding to the given antenna port. Mapping coefficients from multiple antennas comprised in any given antenna group within at least one antenna group comprised in the given antenna port to the given antenna port constitute an analog beamforming vector of the given antenna group. Analog beamforming vectors corresponding to the at least one antenna group comprised in the given antenna port are arranged diagonally to form an analog beamforming matrix corresponding to the given antenna port. Mapping coefficients from the at least one antenna group comprised in the given antenna port to the given antenna port constitute a digital beamforming vector corresponding to the given antenna port. A beamforming vector corresponding to the given antenna port is acquired as a product of the analog beamforming matrix and the digital beamforming vector corresponding to the given antenna port.

FIG. 11 illustrates two antenna ports, namely, antenna port #0 and antenna port #1. The antenna port #0 consists of antenna group #0, and the antenna port #1 consists of antenna group #1 and antenna group #2. Mapping coefficients from multiple antennas of the antenna group #0 to the antenna port #0 constitute an analog beamforming vector #0; mapping coefficients from the antenna group #0 to the antenna port #0 constitute a digital beamforming vector #0; a beamforming vector corresponding to the antenna port #0 is acquired as a product of the analog beamforming vector #0 and the digital beamforming vector #0. Mapping coefficients from multiple antennas of the antenna group #1 and multiple antennas of the antenna group #2 to the antenna port #1 respectively constitute an analog beamforming vector #1 and an analog beamforming vector #2; and mapping coefficients from the antenna group #1 and the antenna group #2 to the antenna port #1 constitute a digital beamforming vector #1. A beamforming vector corresponding to the antenna port #1 is acquired as a product of an analog beamforming matrix formed by the analog beamforming vector #1 and the analog beamforming vector #2 arranged diagonally and the digital beamforming vector #1.

In one embodiment, the antenna port is an antenna port, and the specific meaning of the antenna port can be found in 3 GPP TS38.211, section 4.4.

In one embodiment, a small-scale channel parameter that a radio signal transmitted by one antenna port goes through can be used for inferring a small-scale channel parameter that another radio signal transmitted by the antenna port goes through.

In one embodiment, a small-scale channel parameter that a radio signal transmitted by one antenna port goes through cannot be used for inferring a small-scale channel parameter of a radio signal transmitted by another the antenna port goes through.

In one embodiment, the small-scale channel parameter includes one or more of Channel Impulse Response (CIR), a Precoding Matrix Indicator (PMI), a Channel Quality Indicator (CQI), and a Rank Indicator (RI).

In one embodiment, an antenna port only comprises one antenna group, i.e., one RF chain, for instance, the antenna port #0 in FIG. 11.

In one subembodiment of the above embodiment, the analog beamforming matrix corresponding to the one antenna port is subjected to dimensionality reduction to form an analog beamforming vector, and the digital beamforming vector corresponding to the one antenna port is subjected to dimensionality reduction to form a scaler, a beamforming vector corresponding to the one antenna port is equal to an analog beamforming vector corresponding thereto. For example, the antenna port #0 in FIG. 11 only comprises the antenna group #0, the digital beamforming vector #0 in FIG. 11 is subjected to dimensionality reduction to form a scaler, a beamforming vector corresponding to the antenna port #0 is the analog beamforming vector #0.

In one embodiment, an antenna port comprises multiple antenna groups, i.e., multiple RF chains, including the antenna port #1 in FIG. 11.

In one embodiment, two antennas being Quasi Co-Located (QCL) refers to: large-scale properties of a channel that a radio signal transmitted by one of the two antenna ports goes through can be used for inferring large-scale properties of a channel that a radio signal transmitted by the other one of the two antenna ports goes through. The specific meaning of the QCL can be found in 3GPP TS38. 211, section 4.4.

In one embodiment, the large-scale properties include one or more of delay spread, Doppler spread, Doppler shift, average gain, average delay, and Spatial Rx parameters.

Embodiment 12

Embodiment 12 illustrates a schematic diagram of a first precoding matrix; as shown in FIG. 12.

In Embodiment 12, wherein the first signaling in the present disclosure indicates the first precoding matrix, and the first precoding matrix is a precoding matrix corresponding to the first radio signal in the present disclosure. The first precoding matrix comprises at least one row and at least one column. In FIG. 12, $a_{p,q}$ represents an element in the p-th row and the q-th column in the first precoding matrix; the p is a positive integer not greater than P, and the q is a positive integer not greater than Q; the P and the Q are respectively row number and column number of the first precoding matrix.

In one embodiment, the first signaling explicitly indicates the first precoding matrix.

In one embodiment, the first signaling implicitly indicates the first precoding matrix.

In one embodiment, the first signaling indicates an index of the first precoding matrix.

In one embodiment, an index of the first precoding matrix is a Transmitted Precoding Matrix Indicator (TPMI).

In one embodiment, the first signaling indicates a TPMI corresponding to the first precoding matrix.

In one embodiment, a number of rows of the first precoding matrix is greater than 1.

In one embodiment, a number of rows of the first precoding matrix belongs to 2 and 4.

In one embodiment, a number of rows of the first precoding matrix belongs to 2, 4, 6 and 8.

In one embodiment, a number of columns of the first precoding matrix is greater than 1.

In one embodiment, a number of columns of the first precoding matrix is equal to 1.

In one embodiment, any element in the first precoding matrix is a complex number.

In one embodiment, at least one element in the first precoding matrix is zero.

In one embodiment, any element in the first precoding matrix is non-zero.

In one embodiment, at least one element in the first precoding matrix is non-zero.

In one embodiment, the first value in the present disclosure is equal to a number of non-zero rows in the first precoding matrix.

In one embodiment, the number of the antenna ports configured to the PUSCH bearing the first radio signal in the present disclosure is equal to rows of the first precoding matrix.

In one embodiment, a number of transmitting antenna ports of the first radio signal is equal to a number of columns of the first precoding matrix.

In one embodiment, the first precoding matrix is a precoding matrix in a first codebook, and the first codebook comprises at least one precoding matrix; the first codebook is one of K1 candidate codebooks, the K1 is a positive integer greater than 1, and the first codebook is related to the first index in the present disclosure.

In one subembodiment of the above embodiment, the first index is used to determine the first codebook out of the K1 candidate codebooks.

In one subembodiment of the above embodiment, the K1 is equal to the K in the present disclosure.

In one subembodiment of the above embodiment, the K1 is not equal to the K in the present disclosure.

In one subembodiment of the above embodiment, the K1 candidate codebooks respectively correspond to K1 index sets, and any of the K1 index sets comprises at least one index; the first index is an index in a second target index set in the K1 index sets, and the first codebook is one of the K1 candidate codebooks corresponding to the second target index set.

In one subembodiment of the above embodiment, the K1 candidate codebooks are pre-defined.

In one subembodiment of the above embodiment, the K1 candidate codebooks are configured by a higher-layer signaling.

In one subembodiment of the above embodiment, the K1 candidate codebooks are configured by an RRC signaling.

Embodiment 13

Embodiment 13 illustrates a schematic diagram of a relation between a first reference signal and a first radio signal; as shown in FIG. 13.

In embodiment 13, the first signaling in the present disclosure is used to determine the first reference signal resource in the present disclosure, the first reference signal resource is reserved for the first reference signal, and the first reference signal is used to determine a transmitting antenna port of the first radio signal.

In one embodiment, the first reference signal resource is reserved for transmitting the first reference signal.

In one embodiment, the first reference signal resource comprises an SRS resource.

In one embodiment, the first reference signal resource comprises an SRS resource set.

In one embodiment, the first reference signal resource occurs multiple times in time domain.

In one subembodiment of the above embodiment, the first reference signal resources occurs at equal intervals in time domain.

In one embodiment, the first reference signal resource occurs only once in time domain.

In one embodiment, the first reference signal comprises an SRS.

In one embodiment, the first reference signal is periodic.

In one embodiment, the first reference signal is semi-persistent.

In one embodiment, the first reference signal is aperiodic.

In one embodiment, the first reference signal is broadband.

In one embodiment, a system bandwidth is divided into at least one frequency-domain region, and the first reference signal occurs in each of the at least one frequency-domain region.

In one embodiment, the first reference signal is narrowband.

In one embodiment, a system bandwidth is divided into at least one frequency-domain region, and the first reference signal only occurs in part of the at least one frequency-domain region.

In one embodiment, any of the at least one frequency-domain region comprises at least one consecutive subcarrier.

In one embodiment, any two of the positive integer number of frequency-domain regions comprise equal numbers of subcarriers.

In one embodiment, the first signaling explicitly indicates the first reference signal resource.

In one embodiment, the first signaling implicitly indicates the first reference signal resource.

In one embodiment, the first signaling comprises a first field, and the first field of the first signaling indicates the first reference signal resource.

In one subembodiment of the above embodiment, the first field in the first signaling indicates an index of the first reference signal resource.

In one subembodiment of the above embodiment, the first field in the first signaling comprises part or all of information in an SRS resource indicator field.

In one subembodiment of the above embodiment, the first field in the first signaling is an SRS resource indicator field.

In one embodiment, the first index in the present disclosure indicates the first reference signal resource.

In one embodiment, the first index in the present disclosure is an index of the first reference signal resource.

In one embodiment, an index of the first reference signal resource is an SRI.

In one embodiment, an index of the first reference signal resource is an SRS-ResourceId.

In one embodiment, an index of the first reference signal resource is an SRS-ResourceSetId.

In one embodiment, an index of the first reference signal resource is an SRI-PUSCH-PowerControlId.

In one embodiment, the first index being used to determine a transmitting antenna port of the first radio signal in the present disclosure includes: the first index indicates the first reference signal resource; and the first reference signal is used to determine a transmitting antenna port of the first radio signal.

In one embodiment, the first reference signal being used to determine a transmitting antenna port of the first radio signal includes: the first reference signal is used to determine at least one transmitting antenna port of the first radio signal.

In one embodiment, the first reference signal being used to determine a transmitting antenna port of the first radio signal includes: the first reference signal is used to determine all transmitting antenna ports of the first radio signal.

In one embodiment, the first reference signal being used to determine a transmitting antenna port of the first radio signal includes: the UE in the present disclosure uses a same spatial-domain filter to transmit the first reference signal and the first radio signal.

In one embodiment, the first reference signal being used to determine a transmitting antenna port of the first radio signal includes: the UE in the present disclosure uses a same spatial-domain filter to transmit the first reference signal and a DMRS of the first radio signal.

In one embodiment, the first reference signal being used to determine a transmitting antenna port of the first radio signal includes: the UE in the present disclosure uses a same precoding matrix to transmit the first reference signal and the first radio signal.

In one embodiment, the first reference signal being used to determine a transmitting antenna port of the first radio signal includes: the UE in the present disclosure uses a same precoding matrix to transmit the first reference signal and a DMRS of the first radio signal.

In one embodiment, the first reference signal being used to determine a transmitting antenna port of the first radio signal includes: a transmitting antenna port of the first radio signal is QCL with a transmitting antenna port of the first reference signal.

In one embodiment, the first reference signal being used to determine a transmitting antenna port of the first radio signal includes: a transmitting antenna port of a DMRS of the first radio signal is QCL with a transmitting antenna port of the first reference signal.

In one embodiment, the first reference signal being used to determine a transmitting antenna port of the first radio signal includes: at least one transmitting antenna port of the first radio signal is QCL with a transmitting antenna port of the first reference signal.

In one embodiment, the first reference signal being used to determine a transmitting antenna port of the first radio signal includes: at least one transmitting antenna port of a DMRS of the first radio signal is QCL with a transmitting antenna port of the first reference signal.

In one embodiment, the first radio signal comprises M1 sub-signals, M1 being a positive integer greater than 1, and the M1 sub-signals are respectively transmitted on M1 antenna ports; the first reference signal being used to determine a transmitting antenna port of the first radio signal includes: the first reference signal is use to determine a transmitting antenna port of at least one of the M1 sub-signals.

In one subembodiment of the above embodiment, the UE in the present disclosure uses a same spatial-domain filter to transmit the first reference signal and at least one of the M1 sub-signals.

In one subembodiment of the above embodiment, the UE in the present disclosure uses a same spatial-domain filter to transmit the first reference signal and a DMRS of at least one of the M1 sub-signals.

In one subembodiment of the above embodiment, the UE in the present disclosure uses a same precoding matrix to transmit the first reference signal and at least one of the M1 sub-signals.

In one subembodiment of the above embodiment, the UE in the present disclosure uses a same precoding matrix to transmit the first reference signal and a DMRS of at least one of the M1 sub-signals.

In one embodiment, the number of the antenna ports configured to the PUSCH bearing the first radio signal in the present disclosure is equal to a number of antenna ports configured in the first reference signal resource.

In one embodiment, a first information element is used to configure the first reference signal resource, and the first information element indicates a number of antenna ports configured in the first reference signal resource.

In one subembodiment of the above embodiment, the first information element comprises all or part of information in an IE.

In one subembodiment of the above embodiment, the first information element comprises all or part of information in an SRS-Config IE.

In one subembodiment of the above embodiment, the first information element is an SRS-Config IE.

In one subembodiment of the above embodiment, the first information element comprises first sub-information, and the first sub-information indicates an index of the first reference signal resource; and the first sub-information comprises part or all of information in an srs-ResourceId field in an SRS-Resource.

In one subembodiment of the above embodiment, the first information element comprises first sub-information, and the first sub-information indicates an index of the first reference signal resource; the first sub-information comprises part or all of information in an srs-ResourceSetId field in an SRS-ResourceSet.

In one subembodiment of the above embodiment, the first information element comprises second sub-information, the second sub-information indicates a number of antenna ports configured in the first reference signal resource, and the second sub-information comprises part or all of information in a nrofSRS-Ports field in an SRS-Config IE.

In one embodiment, the specific diagram of the SRS-Config IE can be found in 3GPP TS38.331.

In one embodiment, the specific meaning of the SRS-Resource can be found in 3GPP TS38.331.

In one embodiment, the specific meaning of the SRS-ResourceSet can be found in 3GPP TS38.331.

In one embodiment, the specific meaning of the SRS-ResourceId field can be found in 3GPP TS38.331.

In one embodiment, the specific meaning of the srs-ResourceSetId field can be found in 3GPP TS38.331.

In one embodiment, the specific meaning of the nrofSRS-Ports field can be found in 3GPP TS38.331.

In one embodiment, a measurement performed on the first reference signal is used to determine an MCS of the first radio signal.

Embodiment 14

Embodiment 14 illustrates a schematic diagram of a relation between a second reference signal and a first radio signal; as shown in FIG. 14.

In embodiment 14, the first signaling in the present disclosure is used to determine the second reference signal resource in the present disclosure, the second reference signal resource is reserved for the second reference signal, and a measurement performed on the second reference signal is used to determine a transmitting antenna port of the first radio signal.

In one embodiment, the second reference signal resource is reserved for transmitting the second reference signal.

In one embodiment, the second reference signal resource comprises a CSI-RS resource.

In one embodiment, the second reference signal resource comprises an NZP CSI-RS resource.

In one embodiment, the second reference signal resource comprises a CSI-RS resource set.

In one embodiment, the second reference signal resource comprises an NZP CSI-RS resource set.

In one embodiment, the second reference signal resource occurs multiple times in time domain.

In one subembodiment of the above embodiment, the second reference signal resources occurs at equal intervals in time domain.

In one embodiment, the second reference signal resource occurs only once in time domain.

In one embodiment, the second reference signal comprises a CSI-RS.

In one embodiment, the second reference signal comprises an SS/PBCH block.

In one embodiment, the second reference signal is periodic.

In one embodiment, the second reference signal is semi-persistent.

In one embodiment, the second reference signal is aperiodic.

In one embodiment, the second reference signal is broadband.

In one embodiment, a system bandwidth is divided into at least one frequency-domain region, and the second reference signal occurs in each of the at least one frequency-domain region.

In one embodiment, the second reference signal is narrowband.

In one embodiment, a system bandwidth is divided into at least one frequency-domain region, and the second reference signal only occurs in part of the at least one frequency-domain region.

In one embodiment, the first signaling implicitly indicates the second reference signal resource.

In one embodiment, the first signaling indicates the first reference signal resource in the present disclosure, and the first reference signal resource is associated with the second reference signal resource.

In one subembodiment of the above embodiment, the first reference signal resource being associated with the second reference signal resource includes: the UE in the present disclosure uses a same spatial-domain filter to transmit the first reference signal and receive the second reference signal.

In one embodiment, the first reference signal resource in the present disclosure is associated with the second reference signal resource, and the first information element indicates that the first reference signal resource is associated with the second reference signal resource.

In one subembodiment of the above embodiment, the first information element comprises all or part of information in an SRS-Config IE.

In one subembodiment of the above embodiment, the first information element comprises first sub-information, and the first sub-information indicates an index of the first reference signal resource.

In one subembodiment of the above embodiment, the first sub-information comprises part or all of information in an srs-ResourceId field in an SRS-Resource.

In one subembodiment of the above embodiment, the first sub-information comprises part or all of information in an srs-ResourceSetId field in an SRS-ResourceSet.

In one subembodiment of the above embodiment, the first information element comprises eighth sub-information, and the eighth sub-information indicates an index of the second reference signal resource.

In one subembodiment of the above embodiment, the eighth sub-information comprises part or all of information in a spatialRelationInfo field in an SRS-Resource.

In one subembodiment of the above embodiment, the eighth sub-information comprises part or all of information in a csi-RS field in an SRS-ResourceSet.

In one subembodiment of the above embodiment, the eighth sub-information comprises part or all of information in an associatedCSI-RS field in an SRS-ResourceSet.

In one subembodiment of the above embodiment, the eighth sub-information comprises part or all of information in SRS-SpatialRelationInfo.

In one embodiment, the second reference signal resource is used to determine the first index in the present disclosure.

In one embodiment, the first index in the present disclosure is an index of the second reference signal resource.

In one embodiment, the second reference signal resource belongs to a second reference signal resource set, the second reference signal resource set comprises at least one reference signal resource, and the first index is an index of the second reference signal resource set.

In one embodiment, an index of the second reference signal resource is SSB index.

In one embodiment, an index of the second reference signal resource is NZP-CSI-RS-ResourceId.

In one embodiment, an index of the second reference signal resource is NZP-CSI-RS-ResourceSetId.

In one embodiment, the first index being used to determine a transmitting antenna port of the first radio signal in the present disclosure includes: the first index indicates the second reference signal resource, and a measurement performed on the second reference signal is used to determine a transmitting antenna port of the first radio signal.

In one embodiment, a measurement performed on the second reference signal being used to determine a transmitting antenna port of the first radio signal includes: the UE in the present disclosure uses a same spatial-domain filter to receive the second reference signal and transmit the first radio signal.

In one embodiment, a measurement performed on the second reference signal being used to determine a transmitting antenna port of the first radio signal includes: the UE in the present disclosure uses a same spatial-domain filter to receive the second reference signal and transmit a DMRS of the first radio signal.

In one embodiment, the first radio signal comprises M1 sub-signals, the M1 is a positive integer greater than 1; the M1 sub-signals are respectively transmitted on M1 antenna ports, and a measurement performed on the second reference signal being used to determine a transmitting antenna port of the first radio signal includes: a measurement performed on the second reference signal is use to determine a transmitting antenna port of at least one of the M1 sub-signals.

In one subembodiment of the above embodiment, the UE uses a same spatial domain filter to receive the second reference signal and transmit at least one of the M1 sub-signals.

In one subembodiment of the above embodiment, the UE uses a same spatial filter to receive the second reference signal and transmit a DMRS of at least one of the M1 sub-signals.

Embodiment 15

Embodiment 15 illustrates a schematic diagram of first information being used to determine K candidate coefficients; as shown in FIG. 15.

In embodiment 15, the first information is used to determine the K candidate coefficients in the present disclosure.

In one embodiment, the first information is carried by a higher-layer signaling.

In one embodiment, the first information is carried by an RRC signaling.

In one embodiment, the first information is carried by a Medium Access Control Layer Control Element (MAC CE) signaling.

In one embodiment, the first information is carried by an RRC signaling and a MAC CE signaling together.

In one embodiment, the first information is carried by a physical-layer signaling.

In one embodiment, the first information comprises part or all of information in an IE.

In one embodiment, the first information explicitly indicates the K candidate coefficients.

In one embodiment, the first information implicitly indicates the K candidate coefficients.

Embodiment 16

Embodiment 16 illustrates a schematic diagram of first information being used to determine M candidate indexes; as shown in FIG. 16.

In embodiment 16, the first information is used to determine the M candidate indexes, and the first index in the present disclosure is one of the M candidate indexes.

In one embodiment, the first information comprises part or all of information of a PUSCH-PowerControl IE.

In one embodiment, the first information comprises part or all of information in a sri-PUSCH-Mapping-ToAddModList field in a PUSCH-PowerControl IE.

In one embodiment, the first information comprises part or all of information in an SRI-PUSCH-PowerControl.

In one embodiment, the first information comprises part or all of information in a sri-PUSCH-PowerControlId field in an SRI-PUSCH-PowerControl.

In one embodiment, the specific meaning of the PUSCH-PowerControl IE can be found in 3GPP TS38.331.

In one embodiment, the specific meaning of the sri-PUSCH-MappingToAddModList field can be found in 3GPP TS38.331.

In one embodiment, the specific meaning of the SRI-PUSCH-PowerControl can be found in 3GPP TS38.331.

In one embodiment, the specific meaning of the SRI-PUSCH-PowerControlId can be found in 3GPP TS38.331.

In one embodiment, the specific meaning of the sri-PUSCH-ClosedLoopIndex can be found in 3GPP TS38.331.

In one embodiment, the first information explicitly indicates the M candidate indexes.

In one embodiment, the first information implicitly indicates the M candidate indexes.

In one embodiment, any of the M candidate indexes is a non-negative integer.

In one embodiment, at least one of the M candidate indexes is an SRI-PUSCH-PowerControlId.

In one embodiment, any of the M candidate indexes is an SRI-PUSCH-PowerControlId.

In one embodiment, at least one of the M candidate indexes is an SRI.

In one embodiment, at least one of the M candidate indexes is an SRS-ResourceId.

In one embodiment, at least one of the M candidate indexes is an SRS-ResourceSetId.

In one embodiment, at least one of the M candidate indexes is an SSB-Index.

In one embodiment, at least one of the M candidate indexes is an NZP-CSI-RS-ResourceId.

In one embodiment, at least one of the M candidate indexes is an NZP-CSI-RS-ResourceSetId.

In one embodiment, the first information indicates a relation between the first coefficient and the first index in the present disclosure.

In one embodiment, the first information indicates relations among the K candidate coefficient and the first index in the present disclosure.

In one embodiment, the first information indicates relations among the first coefficient and the M candidate indexes in the present disclosure.

Embodiment 17

Embodiment 17 illustrates a schematic diagram of first information being used to determine K candidate coefficients and M candidate indexes; as shown in FIG. 17. In embodiment 17, the first information is used to determine the K candidate coefficients and the M candidate indexes.

In one embodiment, the first information indicates the K candidate coefficients and the M candidate indexes.

In one embodiment, the first information indicates relations among the K candidate coefficients and the M candidate indexes.

Embodiment 18

Embodiment 18 illustrates a schematic diagram of uplink information being used to determine K, as shown in FIG. 18.

In embodiment 18, the uplink information is used to determine the K.

In one embodiment, the uplink information explicitly indicates the K.

In one embodiment, the uplink information implicitly indicates the K.

In one embodiment, the uplink information indicates a number of antenna panels configured to the UE in the present disclosure.

In one embodiment, the uplink information indicates maximum transmit power of an antenna configured to the UE in the present disclosure.

In one embodiment, the uplink information comprises UE capability information.

In one embodiment, the uplink information comprises part or all of information in a UE capability IE.

In one embodiment, the uplink information comprises part or all of information in a MIMO-ParametersPerBand IE.

In one embodiment, the uplink information comprises part or all of information in an RF-Parameters IE.

In one embodiment, the uplink information comprises part or all of information in a UE-NR-Capability IE.

In one embodiment, the specific meaning of the UE capability IE can be found in 3GPP TS38.331.

In one embodiment, the specific meaning of the MIMO-ParametersPerBand IE can be found in 3GPP TS38.331.

In one embodiment, the specific meaning of the RF-Parameters IE can be found in 3GPP TS38.331.

In one embodiment, the specific meaning of the UE-NR-Capability IE can be found in 3GPP TS38.331.

Embodiment 19

Embodiment 19 illustrates a schematic diagram of determining K and K candidate coefficients; as shown in FIG. 19.

In embodiment 19, the uplink information is used to determine the K and the K candidate coefficients.

In one embodiment, the uplink information indicates the K and the K candidate coefficients.

In one embodiment, the uplink information implicitly indicates the K candidate coefficients.

Embodiment 20

Embodiment 20 illustrates a schematic diagram of R first-type signaling(s); as shown in FIG. 20.

In embodiment 20, the R first-type signaling(s) indicates (respectively indicate) R first-type offset(s), the second power in the present disclosure is equal to a minimum value of first reference power and a first power threshold, and the first reference power is linearly related to a sum of the R first-type offset(s); the R is a positive integer; the R first-type signaling(s) is (are respectively) used to determine R first-type index(es), and the first signaling in the present disclosure is used to determine a second index; each of value(s) of the R first-type index(es) is equal to the second index. In FIG. 20, indexes of the R first-type signaling(s), the R first-type offset(s) and the R first-type index(es) are respectively #0, . . . , #R-1.

In one embodiment, the R is greater than 1.

In one embodiment, the R is equal to 1.

In one embodiment, the R first-type signaling(s) acts (act) on a same carrier.

In one embodiment, the R first-type signaling(s) acts (act) on a same BWP.

In one embodiment, time-domain resources occupied by any two of the R first-type signalings are mutually-orthogonal (not overlapping).

In one embodiment, each of the R first-type signaling(s) is a physical-layer signalings.

In one embodiment, each of the R first-type signaling(s) is a dynamic signaling.

In one embodiment, at least one of the R first-type signaling(s) is a dynamic signaling used for Uplink Grant.

In one embodiment, at least one of the R first-type signaling(s) is a dynamic signaling used for transmission of a Transmitter Power Control command of a PUCCH and a PUSCH.

In one embodiment, any of the R first-type signaling(s) comprises DCI.

In one embodiment, a signaling format corresponding to at least one of the R first-type signaling(s) is DCI format 0_1 or DCI format 0_0.

In one embodiment, at least one of the R first-type signaling(s) comprises DCI identified by a Cell-RNTI.

In one embodiment, a signaling format corresponding to at least one of the R first-type signaling(s) is DCI format 2_2, and the specific meaning of the DCI format 2_2 can be found in 3GPP TS28.212.

In one embodiment, at least one of the R first-type signaling(s) comprises DCI identified by a TPC-PUSCH-RNTI.

In one embodiment, at least one of the R first-type signaling(s) comprises DCI identified by a TPC-PUCCH-RNTI.

In one embodiment, the first signaling implicitly indicates the second index.

In one embodiment, the first signaling comprises a first field, the first field in the first signaling indicates the first reference signal resource in the present disclosure, and the first reference signal resource is used to determine the second index; and a second information element is used to indicate a relation between the first reference signal resource and the second index.

In one subembodiment of the above embodiment, the second information element comprises part or all of information in a PUSCH-PowerControl IE.

In one subembodiment of the above embodiment, the second information element comprises part or all of information in an SRI-PUSCH-PowerControl.

In one subembodiment of the above embodiment, the second information element comprises third sub-information, the third sub-information indicates an index of the first reference signal resource, and the third sub-information comprises part or all of information in a sri-PUSCH-PowerControlId field in an SRI-PUSCH-PowerControl.

In one subembodiment of the above embodiment, the second information element comprises fourth sub-information, the fourth sub-information indicates the second index, and the fourth sub-information comprises part or all of information in a sri-PUSCH-ClosedLoopIndex field.

In one embodiment, the second index is a closedLoopIndex.

In one embodiment, the second index is a Closed loop indicator.

In one embodiment, the second index is a PUSCH power control adjustment state with index 1. The specific meaning of the PUSCH power control adjustment state with index 1 can be found in 3GPP TS38.213, section 7.

In one embodiment, the first signaling is one of the R first-type signaling(s).

In one subembodiment of the above embodiment, the first signaling is a latest one of the R first-type signaling(s) in time domain.

In one embodiment, any of the R first-type offset(s) is indicated by a TPC.

In one embodiment, the R first-type offset(s) comprises (respectively comprise) R first-type field(s), and the R first-type field(s) indicates (respectively indicate) the R first-type offset(s).

In one subembodiment of the above embodiment, at least one of the R first-type field(s) is a TPC command for scheduled PUSCH field, and the specific meaning of the TPC command for scheduled PUSCH can be found in 3GPP TS38.212, section 7.3.

In one subembodiment of the above embodiment, at least one of the R first-type field(s) is a TPC command field, and the specific meaning of the TPC command field can be found in 3GPP TS38.212, section 7.3.

In one subembodiment of the above embodiment, any of the R first-type field(s) consists of 2 bits.

In one embodiment, the R first-type index(es) is (are respectively) closedLoopIndex(es).

In one embodiment, the R first-type index(es) is (are respectively) Closed loop indicator(s).

In one embodiment, the R first-type index(es) is (are respectively) PUSCH power control adjustment state with index 1, and the specific meaning of the PUSCH power control adjustment state with index 1 can be found in 3GPP T S38. 213, section 7.

In one embodiment, each value of the R first-type index(es) is equal to 0, or each value of the R first-type index(es) is equal to 1.

In one embodiment, the R first-type signaling(s) indicates (respectively indicate) the R first-type index(es).

In one embodiment, at least one of the R first-type signaling(s) explicitly indicates a corresponding first-type index.

In one embodiment, at least one of the R first-type signaling(s) implicitly indicates a corresponding first-type index.

In one embodiment, the R first-type offset(s) comprises (respectively comprise) R second-type field(s), and the R second-type field(s) indicates (respectively indicate) the R first-type offset(s).

In one subembodiment of the above embodiment, at least one of the R second-type field(s) implicitly indicates a corresponding first-type index.

In one subembodiment of the above embodiment, at least one of the R second-type field(s) indicates an SRI.

In one subembodiment of the above embodiment, at least one of the R second-type field(s) comprises part or all of information in an SRS resource indicator field.

In one subembodiment of the above embodiment, at least one of the R second-type field(s) comprises part or all of information in a Closed loop indicator field, and the specific meaning of the Closed loop indicator can be found in 3GPP TS38.212, section 7.3.

In one embodiment, a given first-type signaling is one of the R first-type signaling(s), the given first-type signaling comprises a given second-type field, the given first-type signaling comprises an SRS resource indicator field of the given second-type field, the second-type field comprised in the given first-type signaling indicates a given index, and the given index is used to determine one of the R first-type index(es) corresponding to the given first-type signaling; a third information element is used to indicate a relation between the given index and a first-type index corresponding to the given first-type signaling.

In one subembodiment of the above embodiment, the given index is an SRI-PUSCH-PowerControlId.

In one subembodiment of the above embodiment, the third information element comprises part or all of information in a PUSCH-PowerControl IE.

In one subembodiment of the above embodiment, the third information element comprises part or all of information in an SRI-PUSCH-PowerControl.

In one subembodiment of the above embodiment, the third information element comprises fifth sub-information, and the fifth sub-information indicates the given index; and the fifth sub-information comprises part or all of information in a sri-PUSCH-PowerControlId field in an SRI-PUSCH-PowerControl.

In one subembodiment of the above embodiment, the third information element comprises sixth sub-information, and the sixth sub-information indicates a first-type index corresponding to the given first-type signaling; the sixth sub-information comprises part or all of information in a sri-PUSCH-ClosedLoopIndex field in an SRI-PUSCH-PowerControl.

In one subembodiment of the above embodiment, a signaling format corresponding to the given first-type signaling is DCI format 0_1.

In one subembodiment of the above embodiment, the given first-type signaling is identified by a C-RNTI.

In one embodiment, a given first-type signaling is one of the R first-type signaling(s), the given first-type signaling comprises a given second-type field, the given second-type field comprised in the given first-type signaling is a Closed loop indicator field; the given second-type field comprised in the given first-type signaling explicitly indicates one of the R first-type index(es) corresponding to the given first-type signaling.

In one subembodiment of the above embodiment, a signaling format corresponding to the given first-type signaling is DCI format 2_2.

In one subembodiment of the above embodiment, the given first-type signaling is identified by a TPC-PUSCH-RNTI.

In one subembodiment of the above embodiment, the given first-type signaling is identified by a TPC-PUCCH-RNTI.

Embodiment 21

Embodiment 21 illustrates a schematic diagram of second power; as shown in FIG. 21.

In embodiment 21, the second power is equal to a minimum value between first reference power and a first power threshold, and the first reference power is respectively and linearly related to a first component, a second component, the first pathloss in the present disclosure, a third component, and a sum of the R first-type offset(s) in the present disclosure. Linear coefficients between the first reference power and the first component, the second component, the third component, and the sum of the R first-type offset(s) are respectively 1; a linear coefficient between the first reference power and the first pathloss is a second coefficient.

In one embodiment, the first reference power is measured by dBm.

In one embodiment, the first power threshold is measured by dBm.

In one embodiment, the first power threshold is $P_{CMAX,f,c}(i)$, the $P_{CMAX,f,c}(i)$ is a maximum threshold of transmit power in a PUSCH transmission period indexed as i on a carrier indexed as f of a serving cell indexed as c, and the first radio signal in the present disclosure is transmitted on a carrier indexed as f of a serving cell indexed as c. The specific meaning of the $P_{CMAX,f,c}(i)$ can be found in 3GPP TS38.213.

In one embodiment, a linear coefficient between the first reference power and a sum of the R first-type offset(s) is 1.

In one embodiment, a sum of the R first-type offset(s) is $f_{b,f,c}(i, 1)$, and the specific meaning of the $f_{b,f,c}(i, 1)$ can be found in 3GPP TS38.213.

In one embodiment, the first pathloss is $PL_{b,f,c}(q_d)$, and the specific meaning of the $PL_{b,f,c}(q_d)$ can be found in 3GPP TS38.213.

In one embodiment, a linear coefficient between the first reference power and the first pathloss is a non-negative real number less than or equal to 1.

In one embodiment, a linear coefficient between the first reference power and the first pathloss is $\alpha_{b,f,c}(j)$, and the specific meaning of the $\alpha_{b,f,c}(j)$ can be found in 3GPP TS38.213.

In one embodiment, the first reference power is linearly related to a first component, and a linear coefficient between the first reference power and the first component is 1.

In one subembodiment of the above embodiment, the first component is $P_{0\_PUSCH,b,f,c}(j)$, the $P_{0\_PUSCH,b,f,c}(j)$ is a PUSCH power reference on a BWP indexed as b on a carrier indexed as f of a serving cell indexed as c related to parameter configuration indexed as j, the specific meaning of the $P_{0\_PUSCH,b,f,c}(j)$ can be found in TS38.213. The first radio signal in the present disclosure is transmitted on a BWP indexed as b on a carrier indexed as f of a serving cell indexed as c.

In one embodiment, the first reference power is linearly related to a second component, the second component is related to a bandwidth occupied by the first radio signal in the present disclosure, and a linear coefficient between the first reference power and the second component is 1.

In one subembodiment of the above embodiment, the second component is $10 \log_{10}(2^\mu M_{RB,b,f,c}^{PUSCH}(i))$, wherein the $M_{RB,b,f,c}^{PUSCH}(i)$ is a bandwidth measured by resource block allocated to a PUSCH in a PUSCH transmission period indexed as i on a BWP indexed as b on a carrier indexed as f of a serving cell indexed as c, the first radio signal is transmitted on a BWP indexed as b on a carrier indexed as f of a serving cell indexed as c, the μ is subcarrier spacing configuration. The specific meaning of the $10 \log_{10}(2^\mu M_{RB,b,f,c}^{PUSCH}(i))$ can be found in TS38.213.

In one embodiment, the first reference power is linearly related to a third component, the third component is related to an MCS of the first radio signal in the present disclosure, and a linear coefficient between the first reference power and the third component is 1.

In one subembodiment of the above embodiment, the third component is $\Delta_{TF,b,f,c}(i)$, the $\Delta_{TF,b,f,c}(i)$ is a power offset related to an MCS of the first radio signal in a PUSCH transmission period indexed as i on a BWP indexed as b on a carrier indexed as f of a serving cell indexed as c, and the first radio signal is transmitted on a BWP indexed as b on a carrier indexed as f of a serving cell indexed as c. The specific meaning of the $\Delta_{TF,b,f,c}(i)$ can be found in 3GPP TS38.213.

Embodiment 22

Embodiment 22 illustrates a schematic diagram of a first signaling being used to determine a third reference signal resource; as shown in FIG. 22.

In embodiment 22, the first signaling is used to determine the third index in the present disclosure, the third index indicates the third reference signal resource, the third reference signal resource is reserved for the third reference signal in the present disclosure, and a measurement performed on the third reference signal is used to determine the first pathloss in the present disclosure.

In one embodiment, the third reference signal resource is reserved for transmitting the third reference signal.

In one embodiment, the third reference signal resource comprises a CSI-RS resource.

In one embodiment, the third reference signal resource comprises an NZP CSI-RS resource.

In one embodiment, the third reference signal comprises an CSI-RS.

In one embodiment, the third reference signal comprises an SS/PBCH block.

In one embodiment, the third index is an index of the third reference signal resource.

In one embodiment, the third index is a PUSCH-PathlossReferenceRS-Id.

In one embodiment, the specific meaning of the PUSCH-PathlossReferenceRS-Id field can be found in 3GPP TS38.331.

In one embodiment, an index of the third reference signal resource is SSB-index.

In one embodiment, an index of the third reference signal resource is NZP-CSI-RS-ResourceId.

In one embodiment, the first signaling implicitly indicates the third index.

In one embodiment, the first signaling comprises a first field, the first field in the first signaling indicates the first reference signal resource in the present disclosure, and the first reference signal resource is used to determine the third index; a second information element is used to indicate a relation between the first reference signal resource and the third index.

In one subembodiment of the above embodiment, the second information element comprises part or all of information of a PUSCH-PowerControl IE.

In one subembodiment of the above embodiment, the second information element comprises part or all of information in an SRI-PUSCH-PowerControl.

In one subembodiment of the above embodiment, the second information element comprises third sub-information, the third sub-information indicates an index of the first reference signal resource, and the third sub-information comprises part or all of information in a sri-PUSCH-PowerControlId field in an SRI-PUSCH-PowerControl.

In one subembodiment of the above embodiment, the second information element comprises seventh sub-information, the seventh sub-information indicates the third index, and the seventh sub-information comprises part or all of information in a sri-PUSCH-PathlossReferenceRS-Id field in an SRI-PUSCH-PowerControl.

In one embodiment, the specific meaning of the sri-PUSCH-PathlossReferenceRS-Id field can be found in 3GPP TS38.331.

In one embodiment, the first pathloss is equal to transmit power of the third reference signal minus Reference Signal Received Power (RSRP) of the third reference signal.

Embodiment 23

Figure 23:
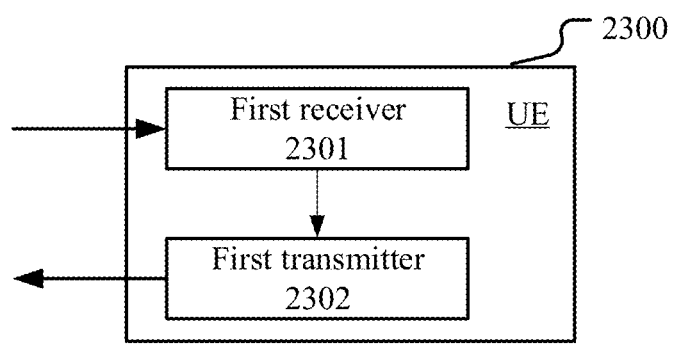
FIG. 23 illustrates a structure block diagram of a processing device in a UE according to one embodiment of the present disclosure.

Embodiment 23 illustrates a structure block diagram of a processing device in a UE; as shown in FIG. 23. In FIG. 23, a processing device 2300 in a UE comprises a first receiver 2301 and a first transmitter 2302.

In Embodiment 23, the first receiver 2301 receives a first signaling; the first transmitter 2302 transmits a first radio signal.

In Embodiment 23, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, wherein the first signaling indicates a first precoding matrix, the first precoding matrix is a precoding matrix corresponding to the first radio signal.

In one embodiment, the first receiver 2301 also receives first information; herein, the first information is used to determine the K candidate coefficients.

In one embodiment, the first receiver 2301 also receives first information; herein, the first information is used to determine M candidate indexes, and the first index is one of the M candidate indexes, M being a positive integer greater than 1.

In one embodiment, the first receiver 2301 also receives first information; herein, the first information is used to determine the K candidate coefficients and M candidate indexes, and the first index is one of the M candidate indexes, M being a positive integer greater than 1.

In one embodiment, the first transmitter 2302 also transmits uplink information; herein, the uplink information is used to determine the K.

In one embodiment, the first transmitter 2302 also transmits uplink information; herein, the uplink information is used to determine the K and the K candidate coefficients.

In one embodiment, the first transmitter 2302 also transmits a first reference signal in a first reference signal resource; herein, the first signaling is used to determine the first reference signal resource, and the first reference signal is used to determine a transmitting antenna port of the first radio signal.

In one embodiment, the first receiver 2301 also receives a second reference signal in a second reference signal resource; herein, the first signaling is used to determine the second reference signal resource, and a measurement performed on the second reference signal is used to determine a transmitting antenna port of the first radio signal.

In one embodiment, the first receiver 2301 also receives R first-type signaling(s); herein, the R first-type signaling(s) indicates (respectively indicate) R first-type offset(s), the second power is equal to a minimum value of first reference power and a first power threshold, and the first reference power is linearly related to a sum of the R first-type offset(s); the R is a positive integer; the R first-type signaling(s) is (are respectively) used to determine R first-type index(es), and the first signaling is used to determine a second index; each of value(s) of the R first-type index(es) is equal to the second index.

In one embodiment, the first receiver 2301 also receives a third reference signal in a third reference signal resource; herein, the first signaling is used to determine a third index, and the third index indicates the third reference signal resource; a measurement performed on the third reference signal is used to determine a first pathloss, the second power is equal to a minimum value of first reference power and a first power threshold, and the first reference power is linearly related to the first pathloss.

In one embodiment, the first receiver 2301 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 2302 comprises at least one of the antenna 452, the transmitter 454, the transmitting processor 468, the multi-antenna transmitting processor 457, the controller/processor 459, the memory 460, or the data source 467 in Embodiment 4.

Embodiment 24

Figure 24:
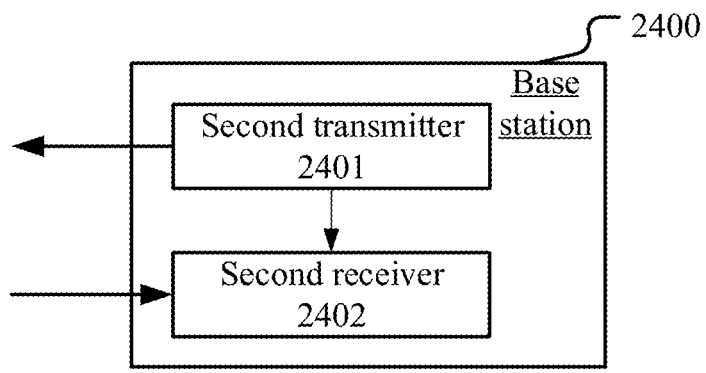
FIG. 24 illustrates a structure block diagram of a processing device in a base station according to one embodiment of the present disclosure.

Embodiment 24 illustrates a block diagram of a processing device for a base station; as shown in FIG. 24. In FIG. 24, a processing device 2400 in a base station comprises a second transmitter 2401 and a second receiver 2402.

In Embodiment 24, the second transmitter 2401 transmits a first signaling; and the second receiver 2402 receives a first radio signal.

In Embodiment 24, the first signaling comprises scheduling information of the first radio signal; the first signaling is used to determine a first index, and the first index is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is related to a first value, the first value is a number of non-zero-power antenna ports occupied by the first radio signal among antenna ports configured to a PUSCH bearing the first radio signal; the first coefficient is related to the first index.

In one embodiment, wherein the first signaling indicates a first precoding matrix, the first precoding matrix is a precoding matrix corresponding to the first radio signal.

In one embodiment, the second transmitter 2401 also transmits first information; herein, the first information is used to determine the K candidate coefficients.

In one embodiment, the second transmitter 2401 also transmits first information; herein, the first information is used to determine M candidate indexes, and the first index is one of the M candidate indexes, M being a positive integer greater than 1.

In one embodiment, the second transmitter 2401 also transmits first information; herein, the first information is used to determine the K candidate coefficients and M candidate indexes, and the first index is one of the M candidate indexes, M being a positive integer greater than 1.

In one embodiment, the second receiver 2402 also receives uplink information; herein, the uplink information is used to determine the K.

In one embodiment, the second receiver 2402 also receives uplink information; herein, the uplink information is used to determine the K and the K candidate coefficients.

In one embodiment, the second receiver 2402 also receives a first reference signal in a first reference signal resource; herein, the first signaling is used to determine the first reference signal resource, and the first reference signal is used to determine a transmitting antenna port of the first radio signal.

In one embodiment, the second transmitter 2401 also transmits a second reference signal in a second reference signal resource; herein, the first signaling is used to determine the second reference signal resource, and a measurement performed on the second reference signal is used to determine a transmitting antenna port of the first radio signal.

In one embodiment, the second transmitter 2401 also transmits R first-type signaling(s); herein, the R first-type signaling(s) indicates (respectively indicate) R first-type offset(s), the second power is equal to a minimum value of first reference power and a first power threshold, and the first reference power is linearly related to a sum of the R first-type offset(s); the R is a positive integer; the R first-type signaling(s) is (are respectively) used to determine R first-type index(es), and the first signaling is used to determine a second index; each of value(s) of the R first-type index(es) is equal to the second index.

In one embodiment, the second transmitter 2401 also transmits a third reference signal in a third reference signal resource; herein, the first signaling is used to determine a third index, and the third index indicates the third reference signal resource; a measurement performed on the third reference signal is used to determine a first pathloss, the second power is equal to a minimum value of first reference power and a first power threshold, and the first reference power is linearly related to the first pathloss.

In one embodiment, the second transmitter 2401 comprises at least one of the antenna 420, the transmitter 418, the transmitting processor 416, the multi-antenna transmitting processor 471, the controller/processor 475, or the memory 476 in Embodiment 4.

In one embodiment, the second receiver 2402 comprises at least one of the antenna 420, the receiver 418, the receiving processor 470, the multi-antenna receiving processor 472, the controller/processor 475, the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communications, comprising:

receiving a first signaling, the first signaling comprising DCI (Downlink Control Information); and transmitting a first radio signal, the first radio signal being transmitted in a PUSCH (Physical Uplink Shared Channel);

wherein the first signaling comprises scheduling information of the first radio signal; the first signaling is used to determine a first index, and the first index is used to determine a transmitting antenna port of the first radio signal; the first index is a SRI (Sounding reference signal Resource Indicator), the first index indicates a first reference signal resource, a first reference signal is transmitted in the first reference signal resource, the first reference signal comprises an SRS (Sounding reference signal), and the first reference signal is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is a positive real number not greater than 1; any of the K candidate coefficients is related to a first value, the first value is a number of non-zero-power antenna ports occupied by the first radio signal among antenna ports configured to the PUSCH bearing the first radio signal; a number of the antenna ports configured to the PUSCH bearing the first radio signal is equal to a number of antenna ports configured in the first reference signal resource; the first index is used to determine the first coefficient out of the K candidate coefficients.

2. The method according to claim 1, wherein the first signaling indicates a first precoding matrix, the first precoding matrix is a precoding matrix corresponding to the first radio signal.

3. The method according to claim 1, wherein the first coefficient is equal to a ratio of the first value to the number of the antenna ports configured to the PUSCH bearing the first radio signal.

4. The method according to claim 1, wherein the K candidate coefficients are respectively equal to a minimum value among K reference candidate coefficients and 1, and each of the K reference candidate coefficients is linearly related to the first value.

5. The method according to claim 2, wherein the first precoding matrix is a precoding matrix in a first codebook, and the first codebook comprises at least one precoding matrix; the first codebook is one of K1 candidate codebooks, the K1 is a positive integer greater than 1, and the first index is used to determine the first codebook out of the K1 candidate codebooks.

6. A method in a base station for wireless communications, comprising:
- transmitting a first signaling, the first signaling comprising DCI (Downlink Control Information); and
- receiving a first radio signal, the first radio signal being transmitted in a PUSCH (Physical Uplink Shared Channel);
- wherein the first signaling comprises scheduling information of the first radio signal; the first signaling is used to determine a first index, and the first index is used to determine a transmitting antenna port of the first radio signal; the first index is a SRI (Sounding reference signal Resource Indicator), the first index indicates a first reference signal resource, a first reference signal is transmitted in the first reference signal resource, the first reference signal comprises an SRS (Sounding reference signal), and the first reference signal is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is a positive real number not greater than 1; any of the K candidate coefficients is related to a first value, the first value is a number of non-zero-power antenna ports occupied by the first radio signal among antenna ports configured to the PUSCH bearing the first radio signal; a number of the antenna ports configured to the PUSCH bearing the first radio signal is equal to a number of antenna ports configured in the first reference signal resource; the first index is used to determine the first coefficient out of the K candidate coefficients.

7. The method according to claim 6, wherein the first signaling indicates a first precoding matrix, the first precoding matrix is a precoding matrix corresponding to the first radio signal.

8. The method according to claim 6, wherein the first coefficient is equal to a ratio of the first value to the number of the antenna ports configured to the PUSCH bearing the first radio signal.

9. The method according to claim 6, wherein the K candidate coefficients are respectively equal to a minimum value among K reference candidate coefficients and 1, and each of the K reference candidate coefficients is linearly related to the first value.

10. The method according to claim 7, wherein the first precoding matrix is a precoding matrix in a first codebook, and the first codebook comprises at least one precoding matrix; the first codebook is one of K1 candidate codebooks, the K1 is a positive integer greater than 1, and the first index is used to determine the first codebook out of the K1 candidate codebooks.

11. A UE for wireless communications, comprising:
- a first receiver, which receives a first signaling, the first signaling comprises DCI (Downlink Control Information); and
- a first transmitter, which transmits a first radio signal, the first radio signal is transmitted in a PUSCH (Physical Uplink Shared Channel);
- wherein the first signaling comprises scheduling information of the first radio signal; the first signaling is used to determine a first index, and the first index is used to determine a transmitting antenna port of the first radio signal; the first index is a SRI (Sounding reference signal Resource Indicator), the first index indicates a first reference signal resource, a first reference signal is transmitted in the first reference signal resource, the first reference signal comprises an SRS (Sounding reference signal), and the first reference signal is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is a positive real number not greater than 1; any of the K candidate coefficients is related to a first value, the first value is a number of non-zero-power antenna ports occupied by the first radio signal among antenna ports configured to the PUSCH bearing the first radio signal; a number of the antenna ports configured to the PUSCH bearing the first radio signal is equal to a number of antenna ports configured in the first reference signal resource; the first index is used to determine the first coefficient out of the K candidate coefficients.

12. The UE according to claim 11, wherein the first signaling indicates a first precoding matrix, the first precoding matrix is a precoding matrix corresponding to the first radio signal.

13. The UE according to claim 11, wherein the first coefficient is equal to a ratio of the first value to the number of the antenna ports configured to the PUSCH bearing the first radio signal.

14. The UE according to claim 11, wherein the K candidate coefficients are respectively equal to a minimum value among K reference candidate coefficients and 1, and each of the K reference candidate coefficients is linearly related to the first value.

15. The UE according to claim 12, wherein the first precoding matrix is a precoding matrix in a first codebook, and the first codebook comprises at least one precoding matrix; the first codebook is one of K1 candidate codebooks, the K1 is a positive integer greater than 1, and the first index is used to determine the first codebook out of the K1 candidate codebooks.

16. A base station for wireless communications, comprising:
- a second transmitter, which transmits a first signaling, the first signaling comprises DCI (Downlink Control Information); and
- a second receiver, which receives a first radio signal, the first radio signal is transmitted in a PUSCH (Physical Uplink Shared Channel);
- wherein the first signaling comprises scheduling information of the first radio signal; the first signaling is used to determine a first index, and the first index is used to determine a transmitting antenna port of the first radio signal; the first index is a SRI (Sounding reference signal Resource Indicator), the first index indicates a first reference signal resource, a first reference signal is transmitted in the first reference signal resource, the first reference signal comprises an SRS (Sounding reference signal), and the first reference signal is used to determine a transmitting antenna port of the first radio signal; transmit power of the first radio signal is first power, and a linear value of the first power is equal to a product of a linear value of second power and a first coefficient; the first coefficient is one of K candidate coefficients, K being a positive integer greater than 1; any of the K candidate coefficients is a positive real number not greater than 1; any of the K candidate coefficients is related to a first value, the first value is a number of non-zero-power antenna ports occupied by the first radio signal among antenna ports configured to the PUSCH bearing the first radio signal; a number of the antenna ports configured to the PUSCH bearing the first radio signal is equal to a number of antenna ports configured in the first reference signal resource; the first index is used to determine the first coefficient out of the K candidate coefficients.

17. The base station according to claim 16, wherein the first signaling indicates a first precoding matrix, the first precoding matrix is a precoding matrix corresponding to the first radio signal.

18. The base station according to claim 16, wherein the first coefficient is equal to a ratio of the first value to the number of the antenna ports configured to the PUSCH bearing the first radio signal.

19. The base station according to claim 16, wherein the K candidate coefficients are respectively equal to a minimum value among K reference candidate coefficients and 1, and each of the K reference candidate coefficients is linearly related to the first value.

20. The base station according to claim 17, wherein the first precoding matrix is a precoding matrix in a first codebook, and the first codebook comprises at least one precoding matrix; the first codebook is one of K1 candidate codebooks, the K1 is a positive integer greater than 1, and the first index is used to determine the first codebook out of the K1 candidate codebooks.

* * * * *